US011955742B2

(12) United States Patent
Sasame et al.

(10) Patent No.: US 11,955,742 B2
(45) **Date of Patent: *Apr. 9, 2024**

(54) ELECTRICAL CONNECTOR WITH CAVITY BETWEEN TERMINALS

(71) Applicants: Amphenol FCI Asia Pte. Ltd., Singapore (SG); Amphenol FCI Connectors Singapore Pte. Ltd., Singapore (SG)

(72) Inventors: Naotaka Sasame, Saitama (JP); Motomu Kajiura, Tokyo (JP); Masahiko Motoyama, Kanagawa (JP)

(73) Assignees: Amphenol FCI Asia Pte. Ltd., Singapore (SG); Amphenol FCI Connectors Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,435

(22) Filed: Sep. 12, 2022

(65) Prior Publication Data

US 2023/0253724 A1 Aug. 10, 2023

Related U.S. Application Data

(63) Continuation of application No. 17/085,342, filed on Oct. 30, 2020, now Pat. No. 11,444,397, which is a (Continued)

(30) Foreign Application Priority Data

Jul. 7, 2015 (SG) .......................... 10201505358W

(51) Int. Cl.
*H01R 12/71* (2011.01)
*H01R 13/502* (2006.01)
(Continued)

(52) U.S. Cl.
CPC ......... *H01R 12/716* (2013.01); *H01R 13/502* (2013.01); *H01R 13/514* (2013.01);
(Continued)

(58) Field of Classification Search
CPC .. H01R 12/716; H01R 13/502; H01R 13/514; H01R 13/631; H01R 13/6585;
(Continued)

(56) References Cited

U.S. PATENT DOCUMENTS 2,996,710 A 8/1961 Pratt
3,002,162 A 9/1961 Garstang
(Continued)

FOREIGN PATENT DOCUMENTS

CN 1075390 A 8/1993
CN 1098549 A 2/1995
(Continued)

OTHER PUBLICATIONS

Chinese Invalidation Request dated Aug. 17, 2021 in connection with Chinese Application No. 200580040906.5.
(Continued)

*Primary Examiner* — Travis S Chambers
(74) *Attorney, Agent, or Firm* — Wolf, Greenfield & Sacks, P.C.

(57) ABSTRACT

An electrical connector includes a housing, first and second sets of terminals and a spacer. The housing has a first sidewall, a second sidewall spaced apart from the first sidewall and a cavity between the first and second sidewalls. The first set of terminals is disposed in the cavity adjacent to the first sidewall. The second set of terminals is disposed in the cavity adjacent to the second sidewall. The spacer is disposed in the cavity between the first and second sets of terminals.

19 Claims, 17 Drawing Sheets

Related U.S. Application Data continuation of application No. 16/745,995, filed on Jan. 17, 2020, now Pat. No. 10,840,622, which is a continuation of application No. 15/742,244, filed as application No. PCT/SG2016/050317 on Jul. 7, 2016, now Pat. No. 10,541,482.

(51) Int. Cl.
*H01R 13/514* (2006.01)
*H01R 13/631* (2006.01)
*H01R 13/6585* (2011.01)
*H01R 12/57* (2011.01)
*H01R 13/26* (2006.01)

(52) U.S. Cl.
CPC ....... *H01R 13/631* (2013.01); *H01R 13/6585* (2013.01); *H01R 12/57* (2013.01); *H01R 13/26* (2013.01)

(58) Field of Classification Search
CPC ........ H01R 12/57; H01R 13/26; H01R 13/40; H01R 13/02
See application file for complete search history.

(56) References Cited

U.S. PATENT DOCUMENTS 3,134,950 A 5/1964 Cook
3,243,756 A 3/1966 Ruete et al.
3,322,885 A 5/1967 May et al.
3,390,369 A 6/1968 Zavertnik et al.
3,390,389 A 6/1968 Bluish
3,505,619 A 4/1970 Bishop
3,530,422 A 9/1970 Goodman
3,573,677 A 4/1971 Detar
3,631,381 A 12/1971 Pittman
3,731,259 A 5/1973 Occhipinti
3,743,978 A 7/1973 Fritz
3,745,509 A 7/1973 Woodward et al.
3,786,372 A 1/1974 Epis et al.
3,825,874 A 7/1974 Peverill
3,848,073 A 11/1974 Simons et al.
3,863,181 A 1/1975 Glance et al.
3,977,757 A 8/1976 Yurtin
3,999,830 A 12/1976 Herrmann, Jr. et al.
4,155,613 A 5/1979 Brandeau
4,175,821 A 11/1979 Hunter
4,195,272 A 3/1980 Boutros
4,215,910 A 8/1980 Walter
4,272,148 A 6/1981 Knack, Jr.
4,276,523 A 6/1981 Boutros et al.
4,286,837 A 9/1981 Yasutake et al.
4,371,742 A 2/1983 Manly
4,408,255 A 10/1983 Adkins
4,447,105 A 5/1984 Ruehl
4,457,576 A 7/1984 Cosmos et al.
4,471,015 A 9/1984 Ebneth et al.
4,472,765 A 9/1984 Hughes
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,571,014 A 2/1986 Robin et al.
4,605,914 A 8/1986 Harman
4,607,907 A 8/1986 Bogursky
4,632,476 A 12/1986 Schell
4,636,752 A 1/1987 Saito
4,655,518 A 4/1987 Johnson et al.
4,674,812 A 6/1987 Thom et al.
4,678,260 A 7/1987 Gallusser et al.
4,682,129 A 7/1987 Bakermans et al.
4,686,607 A 8/1987 Johnson
4,687,267 A 8/1987 Header et al.
4,728,762 A 3/1988 Roth et al.
4,737,598 A 4/1988 O'Connor
4,751,479 A 6/1988 Parr
4,761,147 A 8/1988 Gauthier
4,787,548 A 11/1988 Abbagnaro et al.
4,806,107 A 2/1989 Arnold et al.
4,824,383 A 4/1989 Lemke
4,836,791 A 6/1989 Grabbe et al.
4,846,724 A 7/1989 Sasaki et al.
4,846,727 A 7/1989 Glover et al.
4,871,316 A 10/1989 Herrell et al.
4,876,630 A 10/1989 Dara
4,878,155 A 10/1989 Conley
4,889,500 A 12/1989 Lazar et al.
4,902,243 A 2/1990 Davis
4,948,922 A 8/1990 Varadan et al.
4,970,354 A 11/1990 Iwasa et al.
4,971,726 A 11/1990 Maeno et al.
4,975,084 A 12/1990 Fedder et al.
4,984,992 A 1/1991 Beamenderfer et al.
4,992,060 A 2/1991 Meyer
5,000,700 A 3/1991 Masubuchi et al.
5,041,023 A 8/1991 Lytle
5,046,084 A 9/1991 Barrett et al.
5,046,952 A 9/1991 Cohen et al.
5,046,960 A 9/1991 Fedder
5,066,236 A 11/1991 Broeksteeg
5,135,405 A 8/1992 Fusselman et al.
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,171,161 A 12/1992 Kachlic
5,176,538 A 1/1993 Hansell, III et al.
5,190,472 A 3/1993 Voltz et al.
5,246,388 A 9/1993 Collins et al.
5,259,773 A 11/1993 Champion et al.
5,266,055 A 11/1993 Naito et al.
5,280,257 A 1/1994 Cravens et al.
5,281,762 A 1/1994 Long et al.
5,287,076 A 2/1994 Johnescu et al.
5,323,299 A 6/1994 Weber
5,334,050 A 8/1994 Andrews
5,335,146 A 8/1994 Stucke
5,340,334 A 8/1994 Nguyen
5,346,410 A 9/1994 Moore, Jr.
5,352,123 A 10/1994 Sample et al.
5,403,206 A 4/1995 McNamara et al.
5,407,622 A 4/1995 Cleveland et al.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,490,372 A 2/1996 Schlueter
5,496,183 A 3/1996 Soes et al.
5,499,935 A 3/1996 Powell
5,539,148 A 7/1996 Konishi et al.
5,551,893 A 9/1996 Johnson
5,554,050 A 9/1996 Marpoe, Jr.
5,562,497 A 10/1996 Yagi et al.
5,564,949 A 10/1996 Wellinsky
5,571,991 A 11/1996 Highum et al.
5,597,328 A 1/1997 Mouissie
5,605,469 A 2/1997 Wellinsky et al.
5,620,340 A 4/1997 Andrews
5,651,702 A 7/1997 Hanning et al.
5,660,551 A 8/1997 Sakurai
5,669,789 A 9/1997 Law
5,702,258 A 12/1997 Provencher et al.
5,755,597 A 5/1998 Panis et al.
5,795,191 A 8/1998 Preputnick et al.
5,796,323 A 8/1998 Uchikoba et al.
5,803,768 A 9/1998 Zell et al.
5,810,623 A 9/1998 Regnier et al.
5,831,491 A 11/1998 Buer et al.

(56) References Cited

U.S. PATENT DOCUMENTS

| | | | |
|---|---|---|---|
| 5,833,486 | A | 11/1998 | Shinozaki |
| 5,833,496 | A | 11/1998 | Hollander et al. |
| 5,842,887 | A | 12/1998 | Andrews |
| 5,870,528 | A | 2/1999 | Fukuda |
| 5,885,088 | A | 3/1999 | Brennan et al. |
| 5,885,095 | A | 3/1999 | Cohen et al. |
| 5,887,158 | A | 3/1999 | Sample et al. |
| 5,904,594 | A | 5/1999 | Longueville et al. |
| 5,924,899 | A | 7/1999 | Paagman |
| 5,931,686 | A | 8/1999 | Sasaki et al. |
| 5,959,591 | A | 9/1999 | Aurand |
| 5,961,355 | A | 10/1999 | Morlion et al. |
| 5,971,809 | A | 10/1999 | Ho |
| 5,980,321 | A | 11/1999 | Cohen et al. |
| 5,981,869 | A | 11/1999 | Kroger |
| 5,982,253 | A | 11/1999 | Perrin et al. |
| 5,993,259 | A | 11/1999 | Stokoe et al. |
| 5,997,361 | A | 12/1999 | Driscoll et al. |
| 6,019,616 | A * | 2/2000 | Yagi .................. H01R 13/6582 439/108 |
| 6,042,394 | A | 3/2000 | Mitra et al. |
| 6,083,047 | A | 7/2000 | Paagman |
| 6,102,747 | A | 8/2000 | Paagman |
| 6,116,926 | A | 9/2000 | Ortega et al. |
| 6,120,306 | A | 9/2000 | Evans |
| 6,123,554 | A | 9/2000 | Ortega et al. |
| 6,132,255 | A | 10/2000 | Verhoeven |
| 6,132,355 | A | 10/2000 | Derie |
| 6,135,824 | A | 10/2000 | Okabe et al. |
| 6,146,202 | A | 11/2000 | Ramey et al. |
| 6,152,274 | A | 11/2000 | Blard et al. |
| 6,152,742 | A | 11/2000 | Cohen et al. |
| 6,152,747 | A | 11/2000 | McNamara |
| 6,163,464 | A | 12/2000 | Ishibashi et al. |
| 6,168,469 | B1 | 1/2001 | Lu |
| 6,171,115 | B1 | 1/2001 | Mickievicz et al. |
| 6,171,149 | B1 | 1/2001 | van Zanten |
| 6,174,202 | B1 | 1/2001 | Mitra |
| 6,174,203 | B1 | 1/2001 | Asao |
| 6,174,944 | B1 | 1/2001 | Chiba et al. |
| 6,179,651 | B1 | 1/2001 | Huang |
| 6,179,663 | B1 | 1/2001 | Bradley et al. |
| 6,196,853 | B1 | 3/2001 | Harting et al. |
| 6,203,396 | B1 | 3/2001 | Asmussen et al. |
| 6,206,729 | B1 | 3/2001 | Bradley et al. |
| 6,210,182 | B1 | 4/2001 | Elco et al. |
| 6,210,227 | B1 | 4/2001 | Yamasaki et al. |
| 6,217,372 | B1 | 4/2001 | Reed |
| 6,227,875 | B1 | 5/2001 | Wu et al. |
| 6,231,391 | B1 | 5/2001 | Ramey et al. |
| 6,238,245 | B1 | 5/2001 | Stokoe et al. |
| 6,267,604 | B1 | 7/2001 | Mickievicz et al. |
| 6,273,758 | B1 | 8/2001 | Lloyd et al. |
| 6,293,827 | B1 | 9/2001 | Stokoe |
| 6,296,491 | B1 | 10/2001 | Pickles |
| 6,296,496 | B1 | 10/2001 | Trammel |
| 6,299,438 | B1 | 10/2001 | Sahagian et al. |
| 6,299,483 | B1 | 10/2001 | Cohen et al. |
| 6,299,484 | B2 | 10/2001 | Van Woensel |
| 6,299,492 | B1 | 10/2001 | Pierini et al. |
| 6,315,615 | B1 | 11/2001 | Raistrick |
| 6,322,395 | B1 | 11/2001 | Nishio et al. |
| 6,328,572 | B1 | 12/2001 | Higashida et al. |
| 6,328,601 | B1 | 12/2001 | Yip et al. |
| 6,333,468 | B1 | 12/2001 | Endoh et al. |
| 6,343,955 | B2 | 2/2002 | Billman et al. |
| 6,343,957 | B1 | 2/2002 | Kuo et al. |
| 6,347,962 | B1 | 2/2002 | Line |
| 6,350,134 | B1 | 2/2002 | Fogg et al. |
| 6,358,088 | B1 | 3/2002 | Nishio et al. |
| 6,358,092 | B1 | 3/2002 | Siemon et al. |
| 6,361,363 | B1 | 3/2002 | Hwang |
| 6,364,711 | B1 | 4/2002 | Berg et al. |
| 6,364,713 | B1 | 4/2002 | Kuo |
| 6,375,510 | B2 | 4/2002 | Asao |
| 6,379,188 | B1 | 4/2002 | Cohen et al. |
| 6,380,485 | B1 | 4/2002 | Beaman et al. |
| 6,392,142 | B1 | 5/2002 | Uzuka et al. |
| 6,394,839 | B2 | 5/2002 | Reed |
| 6,394,842 | B1 | 5/2002 | Sakurai et al. |
| 6,396,712 | B1 | 5/2002 | Kuijk |
| 6,398,588 | B1 | 6/2002 | Bickford |
| 6,409,543 | B1 | 6/2002 | Astbury, Jr. et al. |
| 6,428,344 | B1 | 8/2002 | Reed |
| 6,431,914 | B1 | 8/2002 | Billman |
| 6,435,913 | B1 | 8/2002 | Billman |
| 6,435,914 | B1 | 8/2002 | Billman |
| 6,441,313 | B1 | 8/2002 | Novak |
| 6,447,170 | B1 | 9/2002 | Takahashi et al. |
| 6,454,605 | B1 | 9/2002 | Bassler et al. |
| 6,461,202 | B2 | 10/2002 | Kline |
| 6,471,549 | B1 | 10/2002 | Lappohn |
| 6,478,624 | B2 | 11/2002 | Ramey et al. |
| 6,482,017 | B1 | 11/2002 | Van Doorn |
| 6,491,545 | B1 | 12/2002 | Spiegel et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,520,803 | B1 | 2/2003 | Dunn |
| 6,527,587 | B1 | 3/2003 | Ortega et al. |
| 6,528,737 | B1 | 3/2003 | Kwong et al. |
| 6,530,790 | B1 | 3/2003 | McNamara et al. |
| 6,533,613 | B1 | 3/2003 | Turner et al. |
| 6,537,087 | B2 | 3/2003 | McNamara et al. |
| 6,538,524 | B1 | 3/2003 | Miller |
| 6,538,899 | B1 | 3/2003 | Krishnamurthi et al. |
| 6,540,522 | B2 | 4/2003 | Sipe |
| 6,540,558 | B1 | 4/2003 | Paagman |
| 6,540,559 | B1 | 4/2003 | Kemmick et al. |
| 6,541,712 | B1 | 4/2003 | Gately et al. |
| 6,544,072 | B2 | 4/2003 | Olson |
| 6,544,647 | B1 | 4/2003 | Hayashi et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,565,390 | B2 | 5/2003 | Wu |
| 6,579,116 | B2 | 6/2003 | Brennan et al. |
| 6,582,244 | B2 | 6/2003 | Fogg et al. |
| 6,585,540 | B2 | 7/2003 | Gutierrez et al. |
| 6,592,381 | B2 | 7/2003 | Cohen et al. |
| 6,595,801 | B1 | 7/2003 | Leonard et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,922 | B2 | 8/2003 | Torii |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,692,272 | B2 | 2/2004 | Lemke et al. |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,726,492 | B1 | 4/2004 | Yu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,749,463 | B1 | 6/2004 | Fan |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |

(56) References Cited

U.S. PATENT DOCUMENTS 6,792,941 B2 9/2004 Andersson
6,806,109 B2 10/2004 Furuya et al.
6,808,419 B1 10/2004 Korsunsky et al.
6,808,420 B2 10/2004 Whiteman, Jr. et al.
6,814,519 B2 11/2004 Policicchio et al.
6,814,619 B1 11/2004 Stokoe et al.
6,816,486 B1 11/2004 Rogers
6,817,870 B1 11/2004 Kwong et al.
6,823,587 B2 11/2004 Reed
6,830,478 B1 12/2004 Ko et al.
6,830,483 B1 12/2004 Wu
6,830,489 B2 12/2004 Aoyama
6,857,899 B2 2/2005 Reed et al.
6,872,085 B1 3/2005 Cohen et al.
6,875,031 B1 4/2005 Korsunsky et al.
6,899,566 B2 5/2005 Kline et al.
6,903,939 B1 6/2005 Chea, Jr. et al.
6,913,490 B2 7/2005 Whiteman, Jr. et al.
6,932,649 B1 8/2005 Rothermel et al.
6,957,967 B2 10/2005 Petersen et al.
6,960,103 B2 11/2005 Tokunaga
6,971,916 B2 12/2005 Tokunaga
6,979,202 B2 12/2005 Benham et al.
6,979,226 B2 12/2005 Otsu et al.
6,982,378 B2 1/2006 Dickson
6,986,681 B2 1/2006 Tsai
7,004,793 B2 2/2006 Scherer et al.
7,008,267 B2 3/2006 Fan
7,021,969 B2 4/2006 Matsunaga
7,044,794 B2 5/2006 Consoli et al.
7,057,570 B2 6/2006 Irion, II et al.
7,074,086 B2 7/2006 Cohen et al.
7,086,872 B2 8/2006 Myer et al.
7,094,102 B2 8/2006 Cohen et al.
7,104,842 B1 9/2006 Huang et al.
7,108,556 B2 9/2006 Cohen et al.
7,120,327 B2 10/2006 Bozso et al.
7,137,849 B2 11/2006 Nagata
7,156,672 B2 1/2007 Fromm et al.
7,163,421 B1 1/2007 Cohen et al.
7,182,643 B2 2/2007 Winings et al.
7,229,318 B2 6/2007 Winings et al.
7,232,344 B1 6/2007 Gillespie et al.
7,261,591 B2 8/2007 Korsunsky et al.
7,270,573 B2 9/2007 Houtz
7,285,018 B2 10/2007 Kenny et al.
7,303,427 B2 12/2007 Swain
7,309,239 B2 12/2007 Shuey et al.
7,316,585 B2 1/2008 Smith et al.
7,318,740 B1 1/2008 Henry et al.
7,320,614 B2 1/2008 Toda et al.
7,322,845 B2 1/2008 Regnier et al.
7,322,855 B2 1/2008 Mongold et al.
7,331,822 B2 2/2008 Chen n
7,331,830 B2 2/2008 Minich
7,335,063 B2 2/2008 Cohen et al.
7,347,721 B2 3/2008 Kameyama
7,351,114 B2 4/2008 Benham et al.
7,354,274 B2 4/2008 Minich
7,364,464 B2 4/2008 Iino et al.
7,365,269 B2 4/2008 Donazzi et al.
7,371,117 B2 5/2008 Gailus
7,390,218 B2 6/2008 Smith et al.
7,390,220 B1 6/2008 Wu
7,407,413 B2 8/2008 Minich
7,467,977 B1 12/2008 Yi et al.
7,473,124 B1 1/2009 Briant et al.
7,494,383 B2 2/2009 Cohen et al.
7,540,781 B2 6/2009 Kenny et al.
7,554,096 B2 6/2009 Ward et al.
7,581,990 B2 9/2009 Kirk et al.
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,604,502 B2 10/2009 Pan
7,645,165 B2 1/2010 Wu et al.
7,674,133 B2 3/2010 Fogg et al.
7,690,946 B2 4/2010 Knaub et al.
7,699,644 B2 4/2010 Szczesny et al.
7,699,663 B1 4/2010 Little et al.
7,722,401 B2 5/2010 Kirk et al.
7,727,027 B2 6/2010 Chiang et al.
7,727,028 B1 6/2010 Zhang et al.
7,731,537 B2 6/2010 Amleshi et al.
7,731,541 B1 6/2010 Lee et al.
7,753,731 B2 7/2010 Cohen et al.
7,758,357 B2 7/2010 Pan et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,824,192 B2 11/2010 Lin et al.
7,828,595 B2 11/2010 Mathews
7,871,296 B2 1/2011 Fowler et al.
7,874,873 B2 1/2011 Do et al.
7,883,369 B1 2/2011 Sun et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,946,889 B2 5/2011 Mizumura
7,985,097 B2 7/2011 Gulla
7,993,147 B2 8/2011 Cole et al.
8,018,733 B2 9/2011 Jia
8,057,267 B2 11/2011 Johnescu
8,083,553 B2 12/2011 Manter et al.
8,123,544 B2 2/2012 Kobayashi
8,142,207 B1 3/2012 Ljubijankic et al.
8,182,289 B2 5/2012 Stokoe et al.
8,215,968 B2 7/2012 Cartier et al.
8,216,001 B2 7/2012 Kirk
8,251,745 B2 8/2012 Johnescu
8,262,411 B2 9/2012 Kondo
8,267,721 B2 9/2012 Minich
8,272,877 B2 9/2012 Stokoe et al.
8,337,247 B2 12/2012 Zhu
8,348,701 B1 1/2013 Lan et al.
8,371,875 B2 2/2013 Gailus
8,382,524 B2 2/2013 Khilchenko et al.
8,440,637 B2 5/2013 Elmen
8,480,432 B2 7/2013 Wu
8,506,319 B2 8/2013 Ritter et al.
8,506,331 B2 8/2013 Wu
8,545,253 B2 10/2013 Amidon et al.
8,550,861 B2 10/2013 Cohen et al.
8,597,051 B2 12/2013 Yang et al.
8,657,627 B2 2/2014 McNamara et al.
8,678,860 B2 3/2014 Minich et al.
8,715,003 B2 5/2014 Buck et al.
8,715,005 B2 5/2014 Pan
8,740,637 B2 6/2014 Wang et al.
8,764,492 B2 7/2014 Chiang
8,771,016 B2 7/2014 Atkinson et al.
8,864,506 B2 10/2014 Little
8,864,521 B2 10/2014 Atkinson et al.
8,905,777 B2 12/2014 Zhu et al.
8,926,377 B2 1/2015 Kirk et al.
8,944,831 B2 2/2015 Stoner et al.
8,968,034 B2 3/2015 Hsu
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,083,130 B2 7/2015 Casher et al.
9,124,009 B2 9/2015 Atkinson et al.
9,166,317 B2 10/2015 Briant et al.
9,219,335 B2 12/2015 Atkinson et al.

(56) References Cited

U.S. PATENT DOCUMENTS 9,225,085 B2 12/2015 Cartier, Jr. et al.
9,246,253 B1 1/2016 Defibaugh et al.
9,257,778 B2 2/2016 Buck et al.
9,257,794 B2 2/2016 Wanha et al.
9,263,835 B2 2/2016 Guo
9,281,590 B1 3/2016 Liu et al.
9,287,668 B2 3/2016 Chen et al.
9,300,074 B2 3/2016 Gailus
9,337,585 B1 * 5/2016 Yang .................. H01R 13/6583
9,350,095 B2 5/2016 Arichika et al.
9,431,734 B2 8/2016 Guo et al.
9,450,344 B2 9/2016 Cartier, Jr. et al.
9,461,378 B1 10/2016 Chen
9,484,674 B2 11/2016 Cartier, Jr. et al.
9,509,101 B2 11/2016 Cartier, Jr. et al.
9,520,686 B2 12/2016 Hu et al.
9,520,689 B2 12/2016 Cartier, Jr. et al.
9,531,130 B1 12/2016 Phillips et al.
9,537,250 B2 1/2017 Kao et al.
9,640,915 B2 5/2017 Phillips
9,692,183 B2 6/2017 Phillips
9,705,255 B2 7/2017 Atkinson et al.
9,742,132 B1 8/2017 Hsueh
9,748,698 B1 8/2017 Morgan et al.
9,831,588 B2 11/2017 Cohen
9,831,605 B2 11/2017 Buck et al.
9,843,135 B2 12/2017 Guetig et al.
9,887,485 B2 2/2018 Lambie et al.
9,899,774 B2 2/2018 Gailus
9,935,385 B2 4/2018 Phillips et al.
9,972,945 B1 5/2018 Huang et al.
9,997,853 B2 6/2018 Little et al.
9,997,871 B2 6/2018 Zhong
10,050,369 B1 8/2018 Yang
10,122,129 B2 11/2018 Milbrand, Jr. et al.
10,135,197 B2 11/2018 Little et al.
10,186,814 B2 1/2019 Khilchenko et al.
10,211,577 B2 2/2019 Milbrand, Jr. et al.
10,243,304 B2 3/2019 Kirk et al.
10,270,191 B1 4/2019 Li et al.
10,276,995 B2 4/2019 Little
10,283,910 B1 5/2019 Chen et al.
10,320,102 B2 6/2019 Phillips et al.
10,320,125 B2 6/2019 Ju et al.
10,348,040 B2 7/2019 Cartier, Jr. et al.
10,381,767 B1 8/2019 Milbrand, Jr. et al.
10,431,936 B2 10/2019 Horning et al.
10,439,311 B2 10/2019 Phillips et al.
10,511,128 B2 12/2019 Kirk et al.
10,541,482 B2 * 1/2020 Sasame ................ H01R 12/716
10,573,987 B2 2/2020 Osaki et al.
10,601,181 B2 3/2020 Lu et al.
10,680,387 B2 6/2020 Cheng et al.
10,714,875 B2 7/2020 Wan et al.
10,741,944 B2 8/2020 Long
10,777,921 B2 9/2020 Lu et al.
10,797,417 B2 10/2020 Scholeno et al.
10,797,446 B2 10/2020 Liu et al.
10,826,214 B2 11/2020 Phillips et al.
10,833,437 B2 11/2020 Huang et al.
10,840,622 B2 * 11/2020 Sasame ................ H01R 13/514
10,855,020 B1 12/2020 Phillips et al.
10,916,894 B2 2/2021 Kirk et al.
10,931,050 B2 2/2021 Cohen
10,950,961 B2 3/2021 Lai et al.
10,965,064 B2 3/2021 Hsu et al.
11,146,025 B2 10/2021 Lu et al.
11,189,971 B2 11/2021 Lu
11,264,755 B2 3/2022 Te
11,381,015 B2 7/2022 Lu
11,444,397 B2 * 9/2022 Sasame .............. H01R 13/6585
2001/0012730 A1 8/2001 Ramey et al.
2001/0041477 A1 11/2001 Billman et al.
2001/0042632 A1 11/2001 Manov et al.
2001/0046810 A1 11/2001 Cohen et al.
2002/0042223 A1 4/2002 Belopolsky et al.
2002/0061671 A1 5/2002 Torii
2002/0086582 A1 7/2002 Nitta et al.
2002/0089464 A1 7/2002 Joshi
2002/0098738 A1 7/2002 Astbury et al.
2002/0102885 A1 8/2002 Kline
2002/0111068 A1 8/2002 Cohen et al.
2002/0111069 A1 8/2002 Astbury et al.
2002/0115335 A1 8/2002 Saito
2002/0123266 A1 9/2002 Ramey et al.
2002/0132518 A1 9/2002 Kobayashi
2002/0136506 A1 9/2002 Asada et al.
2002/0146926 A1 10/2002 Fogg et al.
2002/0168898 A1 11/2002 Billman et al.
2002/0172469 A1 11/2002 Benner et al.
2002/0181215 A1 12/2002 Guenthner
2002/0192988 A1 12/2002 Droesbeke et al.
2003/0003803 A1 1/2003 Billman et al.
2003/0008561 A1 1/2003 Lappoehn
2003/0008562 A1 1/2003 Yamasaki
2003/0022555 A1 1/2003 Vicich et al.
2003/0027439 A1 2/2003 Johnescu et al.
2003/0109174 A1 6/2003 Korsunsky et al.
2003/0119360 A1 6/2003 Jiang et al.
2003/0143894 A1 7/2003 Kline et al.
2003/0147227 A1 8/2003 Egitto et al.
2003/0220018 A1 11/2003 Winings et al.
2003/0220021 A1 11/2003 Whiteman et al.
2004/0001299 A1 1/2004 van Haaster et al.
2004/0005815 A1 1/2004 Mizumura et al.
2004/0020674 A1 2/2004 McFadden et al.
2004/0043661 A1 3/2004 Okada et al.
2004/0058572 A1 3/2004 Fromm et al.
2004/0072473 A1 4/2004 Wu
2004/0097112 A1 5/2004 Minich et al.
2004/0115968 A1 6/2004 Cohen
2004/0121652 A1 6/2004 Gailus
2004/0171305 A1 9/2004 McGowan et al.
2004/0196112 A1 10/2004 Welbon et al.
2004/0224559 A1 11/2004 Nelson et al.
2004/0235352 A1 11/2004 Takemasa
2004/0259419 A1 12/2004 Payne et al.
2005/0006119 A1 1/2005 Cunningham et al.
2005/0020135 A1 1/2005 Whiteman et al.
2005/0039331 A1 2/2005 Smith
2005/0042928 A1 2/2005 Yi et al.
2005/0048818 A1 3/2005 Pan
2005/0048838 A1 3/2005 Korsunsky et al.
2005/0048842 A1 3/2005 Benham et al.
2005/0070160 A1 3/2005 Cohen et al.
2005/0090299 A1 4/2005 Tsao et al.
2005/0133245 A1 6/2005 Katsuyama et al.
2005/0148239 A1 7/2005 Hull et al.
2005/0176300 A1 8/2005 Hsu et al.
2005/0176835 A1 8/2005 Kobayashi et al.
2005/0215121 A1 9/2005 Tokunaga
2005/0233610 A1 10/2005 Tutt et al.
2005/0277315 A1 12/2005 Mongold et al.
2005/0283974 A1 12/2005 Richard et al.
2005/0287869 A1 12/2005 Kenny et al.
2006/0009080 A1 1/2006 Regnier et al.
2006/0019517 A1 1/2006 Raistrick et al.
2006/0019525 A1 1/2006 Lloyd et al.
2006/0019538 A1 1/2006 Davis et al.
2006/0024983 A1 2/2006 Cohen et al.
2006/0024984 A1 2/2006 Cohen et al.
2006/0068640 A1 3/2006 Gailus
2006/0073709 A1 4/2006 Reid
2006/0104010 A1 5/2006 Donazzi et al.
2006/0141866 A1 6/2006 Shiu
2006/0166551 A1 7/2006 Korsunsky et al.
2006/0166560 A1 7/2006 Shuey et al.
2006/0216969 A1 9/2006 Bright et al.
2006/0255876 A1 11/2006 Kushta et al.
2006/0276082 A1 12/2006 Hung et al.
2006/0292932 A1 12/2006 Benham et al.
2007/0004282 A1 1/2007 Cohen et al.
2007/0004828 A1 1/2007 Khabbaz
2007/0021000 A1 1/2007 Laurx

(56) References Cited

U.S. PATENT DOCUMENTS

| | | | |
|---|---|---|---|
| 2007/0021001 | A1 | 1/2007 | Laurx et al. |
| 2007/0021002 | A1 | 1/2007 | Laurx et al. |
| 2007/0021003 | A1 | 1/2007 | Laurx et al. |
| 2007/0021004 | A1 | 1/2007 | Laurx et al. |
| 2007/0037419 | A1 | 2/2007 | Sparrowhawk |
| 2007/0042639 | A1 | 2/2007 | Manter et al. |
| 2007/0054554 | A1 | 3/2007 | Do et al. |
| 2007/0059961 | A1 | 3/2007 | Cartier et al. |
| 2007/0111597 | A1 | 5/2007 | Kondou et al. |
| 2007/0141872 | A1 | 6/2007 | Szczesny et al. |
| 2007/0155241 | A1 | 7/2007 | Lappohn |
| 2007/0173118 | A1 | 7/2007 | Chen |
| 2007/0197063 | A1 | 8/2007 | Ngo et al. |
| 2007/0218765 | A1 | 9/2007 | Cohen et al. |
| 2007/0243764 | A1 | 10/2007 | Liu et al. |
| 2007/0275583 | A1 | 11/2007 | McNutt et al. |
| 2007/0293084 | A1 | 12/2007 | Ngo |
| 2008/0020640 | A1 | 1/2008 | Zhang et al. |
| 2008/0050968 | A1 | 2/2008 | Chang |
| 2008/0194146 | A1 | 8/2008 | Gailus |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0318455 | A1 | 12/2008 | Beaman et al. |
| 2009/0011641 | A1 | 1/2009 | Cohen et al. |
| 2009/0011643 | A1 | 1/2009 | Amleshi et al. |
| 2009/0011645 | A1 | 1/2009 | Laurx et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0149045 | A1 | 6/2009 | Chen et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2010/0048058 | A1 | 2/2010 | Morgan et al. |
| 2010/0068934 | A1 | 3/2010 | Li et al. |
| 2010/0075538 | A1 | 3/2010 | Ohshida |
| 2010/0081302 | A1 | 4/2010 | Atkinson et al. |
| 2010/0099299 | A1 | 4/2010 | Moriyama et al. |
| 2010/0112846 | A1 | 5/2010 | Kotaka |
| 2010/0124851 | A1 | 5/2010 | Xiong et al. |
| 2010/0144167 | A1 | 6/2010 | Fedder et al. |
| 2010/0203772 | A1 | 8/2010 | Mao et al. |
| 2010/0273359 | A1 | 10/2010 | Walker et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0130038 | A1 | 6/2011 | Cohen et al. |
| 2011/0136388 | A1 | 6/2011 | Fu et al. |
| 2011/0143605 | A1 | 6/2011 | Pepe |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0156929 | A1 | 6/2012 | Manter et al. |
| 2012/0184145 | A1* | 7/2012 | Zeng .................. H01R 13/6585 439/626 |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0237100 | A1 | 9/2013 | Affeltranger |
| 2013/0273781 | A1 | 10/2013 | Buck et al. |
| 2013/0288513 | A1 | 10/2013 | Masubuchi et al. |
| 2013/0316590 | A1 | 11/2013 | Hon |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0024263 | A1 | 1/2014 | Dong et al. |
| 2014/0057498 | A1 | 2/2014 | Cohen |
| 2014/0113487 | A1 | 4/2014 | Chen et al. |
| 2014/0273557 | A1 | 9/2014 | Cartier, Jr. et al. |
| 2014/0273627 | A1 | 9/2014 | Cartier, Jr. et al. |
| 2014/0370729 | A1 | 12/2014 | Wang |
| 2014/0377992 | A1 | 12/2014 | Chang et al. |
| 2015/0056856 | A1 | 2/2015 | Atkinson et al. |
| 2015/0072546 | A1 | 3/2015 | Li |
| 2015/0099408 | A1 | 4/2015 | Myer et al. |
| 2015/0111401 | A1 | 4/2015 | Guo |
| 2015/0111427 | A1 | 4/2015 | Wu et al. |
| 2015/0126068 | A1 | 5/2015 | Fang |
| 2015/0140866 | A1 | 5/2015 | Tsai et al. |
| 2015/0214673 | A1 | 7/2015 | Gao et al. |
| 2015/0236451 | A1 | 8/2015 | Cartier, Jr. et al. |
| 2015/0236452 | A1 | 8/2015 | Cartier, Jr. et al. |
| 2015/0255904 | A1 | 9/2015 | Ito |
| 2015/0255926 | A1 | 9/2015 | Paniagua |
| 2015/0340798 | A1 | 11/2015 | Kao et al. |
| 2015/0380868 | A1 | 12/2015 | Chen et al. |
| 2016/0000616 | A1 | 1/2016 | Lavoie |
| 2016/0118736 | A1 | 4/2016 | Hoyack et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2016/0268744 | A1 | 9/2016 | Little et al. |
| 2017/0077654 | A1 | 3/2017 | Yao et al. |
| 2017/0302031 | A1 | 10/2017 | Cheng et al. |
| 2017/0352970 | A1 | 12/2017 | Liang et al. |
| 2018/0062323 | A1 | 3/2018 | Kirk et al. |
| 2018/0076555 | A1 | 3/2018 | Scholeno et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0212385 | A1 | 7/2018 | Little |
| 2018/0219331 | A1 | 8/2018 | Cartier, Jr. et al. |
| 2018/0241156 | A1 | 8/2018 | Huang et al. |
| 2018/0269607 | A1 | 9/2018 | Wu et al. |
| 2018/0331444 | A1 | 11/2018 | Ono |
| 2019/0006778 | A1 | 1/2019 | Fan et al. |
| 2019/0044284 | A1 | 2/2019 | Dunham |
| 2019/0052019 | A1 | 2/2019 | Huang et al. |
| 2019/0067854 | A1 | 2/2019 | Ju et al. |
| 2019/0165518 | A1 | 5/2019 | Hsu et al. |
| 2019/0173209 | A1 | 6/2019 | Lu et al. |
| 2019/0173232 | A1 | 6/2019 | Lu et al. |
| 2019/0214755 | A1 | 7/2019 | Manickam |
| 2019/0334292 | A1 | 10/2019 | Cartier, Jr. et al. |
| 2020/0021052 | A1 | 1/2020 | Milbrand, Jr. et al. |
| 2020/0076131 | A1 | 3/2020 | Hu et al. |
| 2020/0076132 | A1 | 3/2020 | Yang et al. |
| 2020/0076135 | A1 | 3/2020 | Tang et al. |
| 2020/0153134 | A1 | 5/2020 | Sasame et al. |
| 2020/0161811 | A1 | 5/2020 | Lu |
| 2020/0203865 | A1 | 6/2020 | Wu et al. |
| 2020/0203867 | A1 | 6/2020 | Lu |
| 2020/0203886 | A1 | 6/2020 | Wu et al. |
| 2020/0220289 | A1 | 7/2020 | Scholeno et al. |

(56) References Cited

U.S. PATENT DOCUMENTS

| | | | |
|---|---|---|---|
| 2020/0235529 | A1 | 7/2020 | Kirk et al. |
| 2020/0259294 | A1 | 8/2020 | Lu |
| 2020/0266584 | A1 | 8/2020 | Lu |
| 2020/0266585 | A1 | 8/2020 | Paniagua et al. |
| 2020/0328541 | A1 | 10/2020 | Lai et al. |
| 2020/0335914 | A1 | 10/2020 | Hsu et al. |
| 2020/0358226 | A1 | 11/2020 | Lu et al. |
| 2020/0395698 | A1 | 12/2020 | Hou et al. |
| 2020/0403350 | A1 | 12/2020 | Hsu |
| 2021/0036452 | A1 | 2/2021 | Phillips et al. |
| 2021/0050683 | A1 | 2/2021 | Sasame et al. |
| 2021/0135389 | A1 | 5/2021 | Jiang |
| 2021/0135403 | A1 | 5/2021 | Yang et al. |
| 2021/0135404 | A1 | 5/2021 | Jiang |
| 2021/0159643 | A1 | 5/2021 | Kirk et al. |
| 2021/0175670 | A1 | 6/2021 | Cartier, Jr. et al. |
| 2021/0203096 | A1 | 7/2021 | Cohen |
| 2021/0203104 | A1 | 7/2021 | Chen |
| 2021/0218195 | A1 | 7/2021 | Hsu et al. |
| 2021/0234314 | A1 | 7/2021 | Johnescu et al. |
| 2021/0234315 | A1 | 7/2021 | Ellison et al. |
| 2021/0313726 | A1 | 10/2021 | Huang et al. |
| 2021/0351529 | A1 | 11/2021 | Yang et al. |
| 2021/0399449 | A1 | 12/2021 | Guo et al. |
| 2022/0059954 | A1 | 2/2022 | Yue |
| 2022/0069496 | A1 | 3/2022 | Yi et al. |
| 2022/0077632 | A1 | 3/2022 | Chen et al. |
| 2022/0336980 | A1 | 10/2022 | Lu |
| 2022/0360016 | A1 | 11/2022 | Lu et al. |

FOREIGN PATENT DOCUMENTS

| | | | |
|---|---|---|---|
| CN | 1175101 | A | 3/1998 |
| CN | 192068 | A | 9/1998 |
| CN | 1237652 | A | 12/1999 |
| CN | 1265470 | A | 9/2000 |
| CN | 2400938 | Y | 10/2000 |
| CN | 1275825 | A | 12/2000 |
| CN | 1276597 | A | 12/2000 |
| CN | 1280405 | A | 1/2001 |
| CN | 1299524 | A | 6/2001 |
| CN | 2513247 | Y | 9/2002 |
| CN | 2519434 | Y | 10/2002 |
| CN | 2519458 | Y | 10/2002 |
| CN | 2519592 | Y | 10/2002 |
| CN | 1394829 | A | 2/2003 |
| CN | 1398446 | A | 2/2003 |
| CN | 1471749 | A | 1/2004 |
| CN | 1489810 | A | 4/2004 |
| CN | 1491465 | A | 4/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 2896615 | Y | 5/2007 |
| CN | 1985199 | A | 6/2007 |
| CN | 1996678 | A | 7/2007 |
| CN | 2930006 | Y | 8/2007 |
| CN | 101019277 | A | 8/2007 |
| CN | 101032060 | A | 9/2007 |
| CN | 201000949 | Y | 1/2008 |
| CN | 101176389 | A | 5/2008 |
| CN | 101208837 | A | 6/2008 |
| CN | 101273501 | A | 9/2008 |
| CN | 201112782 | Y | 9/2008 |
| CN | 101312275 | A | 11/2008 |
| CN | 101316012 | A | 12/2008 |
| CN | 201222548 | Y | 4/2009 |
| CN | 201252183 | | 6/2009 |
| CN | 101552410 | A | 10/2009 |
| CN | 201323275 | Y | 10/2009 |
| CN | 101600293 | A | 12/2009 |
| CN | 201374433 | | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 101964463 | A | 2/2011 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102570100 | A | 7/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 103036081 | A | 4/2013 |
| CN | 103594871 | A | 2/2014 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 204190038 | U | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 208078300 | U | 11/2018 |
| CN | 208209042 | U | 12/2018 |
| CN | 208797273 | U | 4/2019 |
| CN | 109994892 | A | 7/2019 |
| CN | 210326355 | U | 4/2020 |
| CN | 112072400 | A | 12/2020 |
| CN | 212412336 | U | 1/2021 |
| CN | 107706675 | B | 4/2021 |
| CN | 212874843 | U | 4/2021 |
| CN | 113517619 | A | 10/2021 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0560551 | A1 | 9/1993 |
| EP | 0774807 | A2 | 5/1997 |
| EP | 0820124 | A2 | 1/1998 |
| EP | 0903816 | A2 | 3/1999 |
| EP | 1018784 | A1 | 7/2000 |
| EP | 1779472 | A1 | 5/2007 |
| EP | 2169770 | A2 | 3/2010 |
| EP | 2388867 | A2 | 11/2011 |
| EP | 2405537 | A1 | 1/2012 |
| GB | 1049435 | A | 11/1966 |

(56) References Cited

FOREIGN PATENT DOCUMENTS

| | | | |
|---|---|---|---|
| GB | 1272347 | A | 4/1972 |
| GB | 2161658 | A | 1/1986 |
| GB | 2283620 | A | 5/1995 |
| HK | 1043254 | | 9/2002 |
| JP | H3-156761 | A2 | 7/1991 |
| JP | H05-54201 | A | 3/1993 |
| JP | H05-234642 | A | 9/1993 |
| JP | H07-57813 | A | 3/1995 |
| JP | H07-302649 | A | 11/1995 |
| JP | H09-63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |
| JP | 2002-075052 | A | 3/2002 |
| JP | 2002-075544 | A | 3/2002 |
| JP | 2002-117938 | A | 4/2002 |
| JP | 2002-151190 | A2 | 5/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-344524 | A | 12/2006 |
| JP | 2009-043717 | A | 2/2009 |
| JP | 2009-110956 | A | 5/2009 |
| JP | 2010-129173 | A | 6/2010 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | | 9/2005 |
| TW | M329891 | | 4/2008 |
| TW | 200835073 | A | 8/2008 |
| TW | M357771 | U | 5/2009 |
| TW | 200926536 | | 6/2009 |
| TW | M474278 | U | 3/2014 |
| TW | M494411 | U | 1/2015 |
| TW | M502979 | | 6/2015 |
| TW | M518837 | U | 3/2016 |
| TW | I535129 | B | 5/2016 |
| TW | M534922 | U | 1/2017 |
| TW | I596840 | | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M605564 | U | 12/2020 |
| TW | M613035 | U | 6/2021 |
| WO | WO 85/02265 | A1 | 5/1985 |
| WO | WO 88/05218 | A1 | 7/1988 |
| WO | WO 98/35409 | A1 | 8/1998 |
| WO | WO 01/39332 | A1 | 5/2001 |
| WO | WO 01/57963 | A2 | 8/2001 |
| WO | WO 2002/061892 | | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2017/007429 | A1 | 1/2017 |
| WO | WO 2018/039164 | A1 | 3/2018 |

OTHER PUBLICATIONS

Chinese Invalidation Request dated Jun. 1, 2021 in connection with Chinese Application No. 200680023997.6.
Chinese Invalidation Request dated Sep. 9, 2021 in connection with Chinese Application No. 201110008089.2.
Chinese Invalidation Request dated Jun. 15, 2021 in connection with Chinese Application No. 201180033750.3.
Chinese Supplemental Observations dated Jun. 17, 2021 in connection with Chinese Application No. 201210249710.9.
Chinese communication for Chinese Application No. 201580014851.4, dated Jun. 1, 2020.
Chinese Office Action for Chinese Application No. 201580014851.4 dated Sep. 4, 2019.
Chinese Invalidation Request dated Mar. 17, 2021 in connection with Chinese Application No. 201610952606.4.
Chinese Office Action for Application No. 201680051491.X dated Apr. 30, 2019.
Chinese Office Action for Chinese Application No. 201780064531.9 dated Jan. 2, 2020.
Chinese Office Action for Chinese Application No. 201780097919.9, dated Dec. 3, 2021.
Chinese Office Action for Chinese Application No. 201780097919.9, dated Mar. 10, 2021.
Chinese Office Action dated Jan. 18, 2021 in connection with Chinese Application No. 202010031395.7.
Chinese Office Action for Chinese Application No. 202010467444.1 dated Apr. 2, 2021.
Chinese Office Action for Chinese Application No. 202010825662.8 dated Sep. 3, 2021.
Chinese Office Action for Chinese Application No. 202010922401.8 dated Aug. 6, 2021.
Extended European Search Report for European Application No. EP 11166820.8 dated Jan. 24, 2012.
European Communication Pursuant to Article 94(3) EPC dated Sep. 8, 2022 for European Application No. 17930428.2.
Extended European Search Report dated May 19, 2021 in connection with European Application No. 17930428.2.
International Preliminary Report on Patentability Chapter II for International Application No. PCT/CN2017/108344 dated Mar. 6, 2020.
International Search Report and Written Opinion for International Application No. PCT/CN2017/108344 dated Aug. 1, 2018.
International Search Report and Written Opinion dated Jul. 18, 2019

(56) References Cited

OTHER PUBLICATIONS for International Application No. PCT/CN2018/118798.
International Search Report and Written Opinion dated Nov. 29, 2021 for International Application No. PCT/CN2021/114671.
International Preliminary Report on Patentability for International Application No. PCT/SG2016/050317 dated Jan. 18, 2018.
International Search Report and Written Opinion for International Application No. PCT/SG2016/050317 dated Oct. 18, 2016.
International Preliminary Report on Patentability for International Application No. PCT/US2005/034605 dated Apr. 3, 2007.
International Search Report with Written Opinion for International Application No. PCT/US2006/025562 dated Oct. 31, 2007.
International Preliminary Report on Patentability for International Application No. PCT/US2006/025562 dated Jan. 9, 2008.
International Search Report and Written Opinion for International Application No. PCT/US2005/034605 dated Jan. 26, 2006.
International Preliminary Report on Patentability for International Application No. PCT/US2010/056482 dated May 24, 2012.
International Search Report and Written Opinion for International Application No. PCT/US2010/056482 dated Mar. 14, 2011.
International Preliminary Report on Patentability for International Application No. PCT/US2011/026139 dated Sep. 7, 2012.
International Search Report and Written Opinion for International Application No. PCT/US2011/026139 dated Nov. 22, 2011.
International Search Report and Written Opinion for International Application No. PCT/US2011/034747 dated Jul. 28, 2011.
International Preliminary Report on Patentability for International Application No. PCT/US2012/023689 dated Aug. 15, 2013.
International Search Report and Written Opinion for International Application No. PCT/US2012/023689 dated Sep. 12, 2012.
International Preliminary Report on Patentability for International Application No. PCT/US2012/060610 dated May 1, 2014.
International Search Report and Written Opinion for International Application No. PCT/US2012/060610 dated Mar. 29, 2013.
International Preliminary Report on Patentability for International Application No. PCT/US2015/012463 dated Aug. 4, 2016.
International Search Report and Written Opinion for International Application No. PCT/US2015/012463 dated May 13, 2015.
International Search Report and Written Opinion for International Application No. PCT/US2017/047905 dated Dec. 4, 2017.
Taiwanese Office Action dated Mar. 5, 2021 in connection with Taiwanese Application No. 106128439.
Taiwanese Office Action dated Jun. 16, 2022 for Taiwan Application No. 107138468.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp.* U.S. Pat. No. 10,381,767. IPR2022-00132. Nov. 4, 2021. 112 pages.
[No Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], AMP Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of Metal. RTP Company. Last Accessed Apr. 30, 2021. 2 pages.
[No Author Listed], EMI Shielding Solutions and EMC Testing Services from Laird Technologies. Laird Technologies. Last acessed Apr. 30, 2021. 1 page.
[No Author Listed], EMI Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], General Product Specification for GbX Backplane and Daughtercard Interconnect System. Revision "B". Teradyne. Aug. 23, 2005. 12 pages.
[No Author Listed], High Speed Backplane Connectors . Tyco Electronics. Product Catalog No. 1773095. Revised Dec. 1, 2008.—40 pages.
[No Author Listed], HOZOX EMI Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.
[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007. 21 pages.
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

(56) References Cited

OTHER PUBLICATIONS

[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub .--xx/products/cables/copper/networking/militar-y/military.sub.--fibre . . . Last archive date Apr. 6, 2008.
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].
[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFP MSA Specification for OSFP Octal Small Form Factor Pluggable Module. Revision 2.0 OSFP MSA. Jan. 14, 2019. 80 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 22, 2008. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company-EMI/RFI Shielding Compounds (Conductive) Data Sheets. RTP Company. Last accessed Apr. 30, 2021. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QSFP+ 4X 10 GB/s Pluggable Transceiver. Revision 4.9. SFF Committee. Aug. 31, 2018. 88 pages.
[No Author Listed], SFF Committee SFF-8665 Specification for QSFP+ 28 GB/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 GB/s Connector (Style B). Revision 1.2. SNIA. Jun. 8, 2018. 21 pages.
[No Author Listed], SFF-8679 Specification for QSFP+ 4X Base Electrical Specification. Rev 1.7. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], SFF-TA-1016 Specification for Internal Unshielded High Speed Connector System. Rev 0.0.1. SNIA SFF TWG Technology Affiliate. Nov. 15, 2019. 40 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.

(56) References Cited

OTHER PUBLICATIONS

[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.
[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.
[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.
Atkinson et al., High Frequency Electrical Connector, U.S. Appl. No. 15/645,931, filed Jul. 10, 2017.
Beaman, High Performance Mainframe Computer Cables. 1997 Electronic Components and Technology Conference. 1997;911-7.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
Hsu, Compact Electrical Connector, U.S. Appl. No. 17/867,067, filed Jul. 18, 2022.
Liu et al., Compact, High Speed Electrical Connector, U.S. Appl. No. 17/477,352, filed Sep. 16, 2021.
Liu et al., High Speed Electrical Connector, U.S. Appl. No. 17/477,391, filed Sep. 16, 2021.
Mcalexander, CV of Joseph C. McAlexander III . Exhibit 1009. 2021. 31 pages.
Mcalexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
Ott, Noise Reduction Techniques In Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Reich et al., Microwave Theory and Techniques. Boston Technical Publishers, Inc. 1965;182-91.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Shi et al., Improving Signal Integrity In Circuit Boards By Incorporating Absorbing Materials. 2001 Proceedings. 51st Electronic Components and Technology Conference, Orlando FL. 2001:1451-56.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.
Wagner et al., Recommended Engineering Practice to Enhance the EMI/EMP Immunity of Electric Power Systems. Electric Research and Management, Inc. Dec. 1992. 209 pages.
Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, Emi Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.
†U.S. Appl. No. 16/760,400, filed Apr. 29, 2020, Hou et al.
†U.S. Appl. No. 16/998,845, filed Aug. 20, 2020, Yue.
†U.S. Appl. No. 17/089,905, filed Nov. 5, 2020, Jiang.
†U.S. Appl. No. 17/089,934, filed Nov. 5, 2020, Jiang.
†U.S. Appl. No. 17/216,463, filed Mar. 29, 2021, Hsu et al.
†U.S. Appl. No. 17/283,511, filed Apr. 7, 2021, Guo et al.
†U.S. Appl. No. 17/402,255, filed Aug. 13, 2021, Yi et al.
†U.S. Appl. No. 17/736,248, filed May 4, 2022, Lu et al.
†U.S. Appl. No. 17/856,507, filed Jul. 1, 2022, Lu et al.
†U.S. Appl. No. 17/867,067, filed Jul. 18, 2022, Hsu.
CN 200580040906.5, Aug. 17, 2021, Chinese Invalidation Request.
CN 200680023997.6, Jun. 1, 2021, Chinese Invalidation Request.
CN 201110008089.2, Sep. 9, 2021, Chinese Invalidation Request.
CN 201180033750.3, Jun. 15, 2021, Chinese Invalidation Request.
CN 201210249710.9, Jun. 17, 2021, Chinese Supplemental Observations.
CN 201580014851.4, Jun. 1, 2020, Chinese Communication.
CN 201580014851.4, Sep. 4, 2019, Chinese Office Action.
CN 201610952606.4, Mar. 17, 2021, Chinese Invalidation Request.
CN 201680051491.X, Apr. 30, 2019, Chinese Office Action.
CN 201780064531.9, Jan. 2, 2020, Chinese Office Action.
CN 201780097919.9, Dec. 3, 2021, Chinese Office Action.
CN 201780097919.9, Mar. 10, 2021, Chinese Office Action.
CN 202010031395.7, Jan. 18, 2021, Chinese Office Action.
CN 202010467444.1, Apr. 2, 2021, Chinese Office Action.
CN 202010825662.8, Sep. 3, 2021, Chinese Office Action.
CN 202010922401.8, Aug. 6, 2021, Chinese Office Action.

(56) References Cited

OTHER PUBLICATIONS

EP 11166820.8, Jan. 24, 2012, Extended European Search Report.
EP 17930428.2, Sep. 8, 2022, European Communication.
EP 17930428.2, May 19, 2021, Extended European Search Report.
PCT/CN2017/108344, Mar. 6, 2020, International Preliminary Report on Patentability Chapter II.
PCT/CN2017/108344, Aug. 1, 2018, International Search Report and Written Opinion.
PCT/CN2018/118798, Jul. 18, 2019, International Search Report and Written Opinion.
PCT/CN2021/114671, Nov. 29, 2021, International Search Report and Written Opinion.
PCT/SG2016/050317, Jan. 18, 2018, International Preliminary Report on Patentability.
PCT/SG2016/050317, Oct. 18, 2016, International Search Report and Written Opinion.
PCT/US2005/034605, Apr. 3, 2007, International Preliminary Report on Patentability.
PCT/US2005/034605, Jan. 26, 2006, International Search Report and Written Opinion.
PCT/US2006/025562, Jan. 8, 2008, International Preliminary Report on Patentability.
PCT/US2006/025562, Oct. 31, 2007, International Search Report with Written Opinion.
PCT/US2010/056482, May 24, 2012, International Preliminary Report on Patentability.
PCT/US2010/056482, Mar. 14, 2011, International Search Report and Written Opinion.
PCT/US2011/026139, Sep. 7, 2012, International Preliminary Report on Patentability.
PCT/US2011/026139, Nov. 22, 2011, International Search Report and Written Opinion.
PCT/US2011/034747, Jul. 28, 2011, International Search Report and Written Opinion.
PCT/US2012/023689, Aug. 15, 2013, International Preliminary Report on Patentability.
PCT/US2012/023689, Sep. 12, 2012, International Search Report and Written Opinion.
PCT/US2012/060610, May 1, 2014, International Preliminary Report on Patentability.
PCT/US2012/060610, Mar. 29, 2013, International Search Report and Written Opinion.
PCT/US2015/012463, Aug. 4, 2016, International Preliminary Report on Patentability.
PCT/US2015/012463, May 13, 2015, International Search Report and Written Opinion.
PCT/US2017/047905, Dec. 4, 2017, International Search Report and Written Opinion.
TW 106128439, Mar. 5, 2021, Taiwanese Office Action.
TW 107138468, Jun. 16, 2022. Taiwanese Office Action.

* cited by examiner (A-A)

(B-B)

ELECTRICAL CONNECTOR WITH CAVITY BETWEEN TERMINALS

RELATED APPLICATIONS

This application is a continuation of U.S. application Ser. No. 17/085,342, filed Oct. 30, 2020, now U.S. Pat. No. 11,444,397, issued Sep. 13, 2022, entitled "ELECTRICAL CONNECTOR WITH CAVITY BETWEEN TERMINALS," which is a continuation of U.S. application Ser. No. 16/745,995, filed Jan. 17, 2020, now U.S. Pat. No. 10,840,622, issued Nov. 17, 2020, entitled "ELECTRICAL CONNECTOR WITH CAVITY BETWEEN TERMINALS," which is a continuation of U.S. application Ser. No. 15/742,244, filed Jan. 5, 2018, now U.S. Pat. No. 10,541,482, issued Jan. 21, 2020, entitled "ELECTRICAL CONNECTOR WITH CAVITY BETWEEN TERMINALS," which is a 35 U.S.C. § 371 National Phase filing of International Application No. PCT/SG2016/050317, filed on Jul. 7, 2016, entitled "ELECTRICAL CONNECTOR," which claims the benefit of and priority to Singapore Patent Application Serial No. 10201505358 W, filed on Jul. 7, 2015, entitled "ELECTRICAL CONNECTOR." The entire contents of these applications are incorporated herein by reference in their entirety.

FIELD OF THE INVENTION

The present invention relates to an electrical connector, and more particularly relates to an electrical board connector.

BACKGROUND

Electrical connectors are widely used in electrical systems for data communication, data storage, data transmission and the like. Board connectors have been used to establish electrical connections between printed circuit boards (PCBs) to which plug connector and counterpart receptacle connector are mounted respectively.

SUMMARY

According to an embodiment, an electrical connector includes a housing, first and second sets of terminals and a spacer. The housing has a first sidewall, a second sidewall spaced apart from the first sidewall and a cavity between the first and second sidewalls. The first set of terminals is disposed in the cavity adjacent to the first sidewall. The second set of terminals is disposed in the cavity adjacent to the second sidewall. The spacer is disposed in the cavity between the first and second sets of terminals.

Other aspects and advantages of the present invention will become apparent from the following detailed description, illustrating by way of example the inventive concept of the present invention.

BRIEF DESCRIPTION OF THE DRAWINGS

Embodiments of the invention are disclosed hereinafter with reference to the drawings, in which.

DETAILED DESCRIPTION

Figure 1:
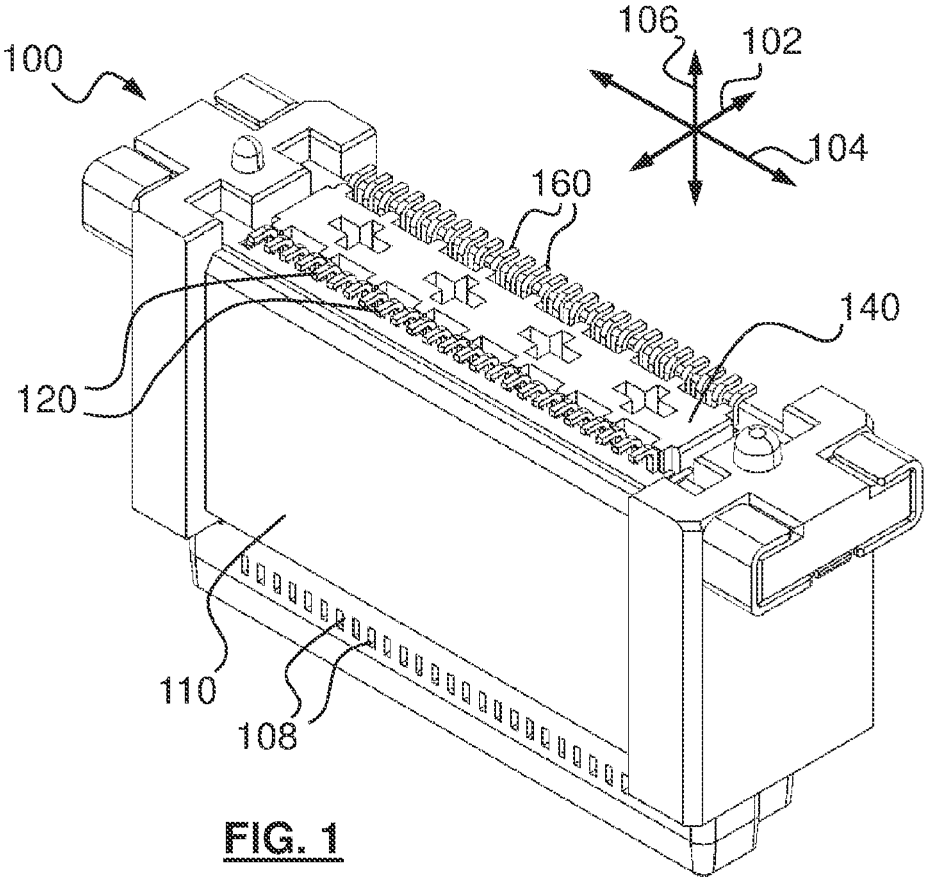
FIG. 1 is a perspective view of an electrical connector in accordance with one embodiment of the present invention.
Figure 2:
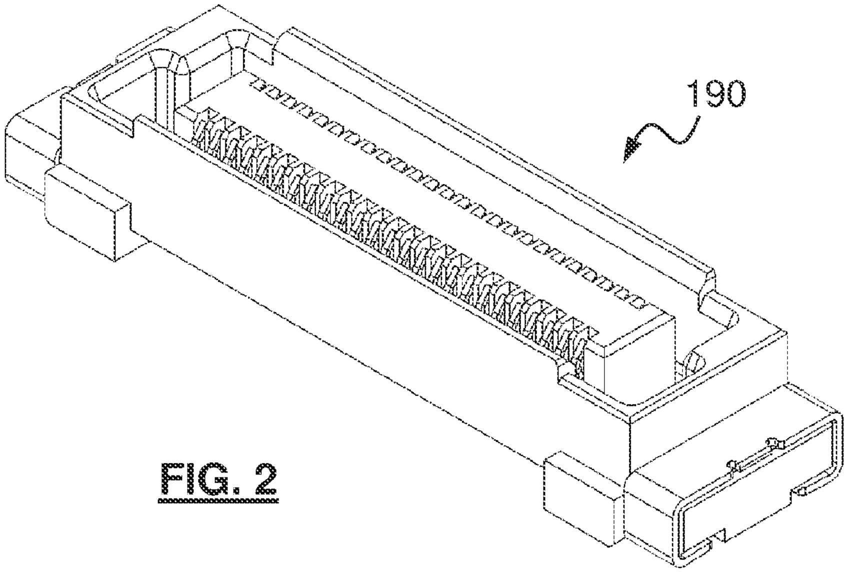
FIG. 2 is a perspective view of a counterpart connector for connecting to the board connector shown in FIG. 1.

As shown in FIGS. 1 to 5, an electrical connector 100 includes a housing 110, a first set of terminals 120, a second set of terminals 160 and a spacer 140. Housing 110 has a first sidewall 112 and a second sidewall 116 spaced apart from first sidewall 112, forming a cavity 114 between first and second side-walls 112, 116. First set of terminals 120 is disposed in cavity 114 and adjacent to first sidewall 112. Second set of terminals 160 is disposed in cavity 114 and adjacent to second sidewall 116. Spacer 140 is disposed in cavity 114 between first set of terminals 120 and second set of terminals 160. Housing 110 defines a depth direction 102, a width direction 104 perpendicular to depth direction 102 and a height, direction 106 perpendicular to depth direction 102 and width direction 104.

Figure 3:
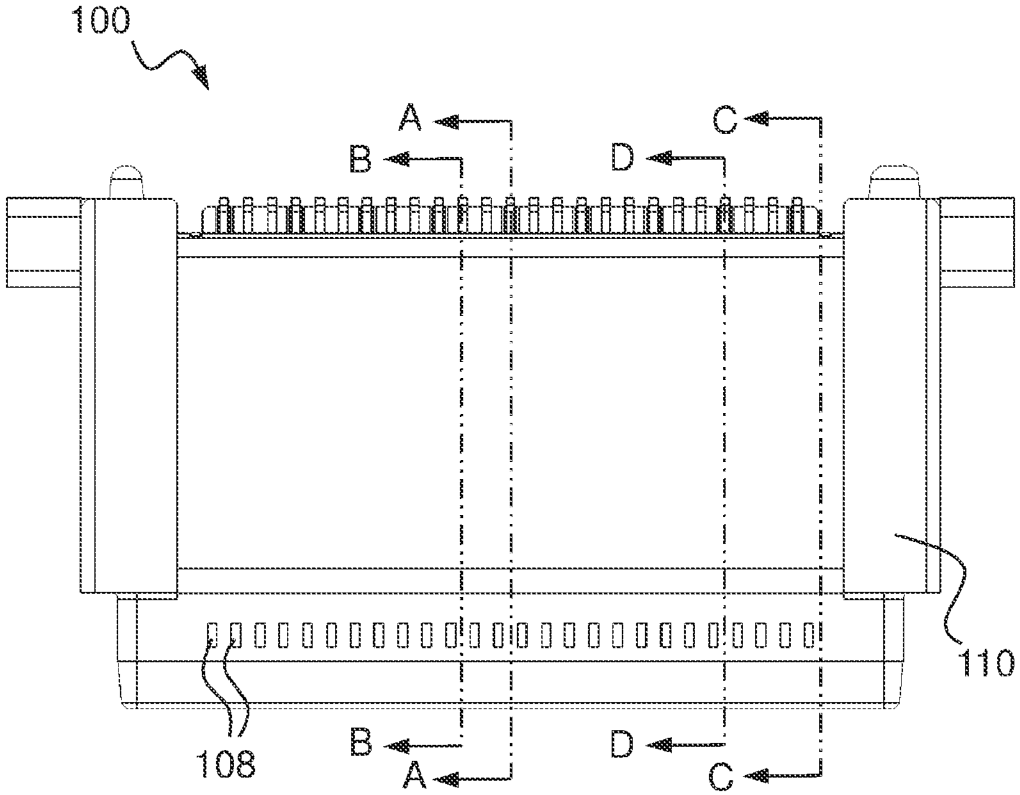
FIG. 3 is a front view of FIG. 1.
Figure 4:
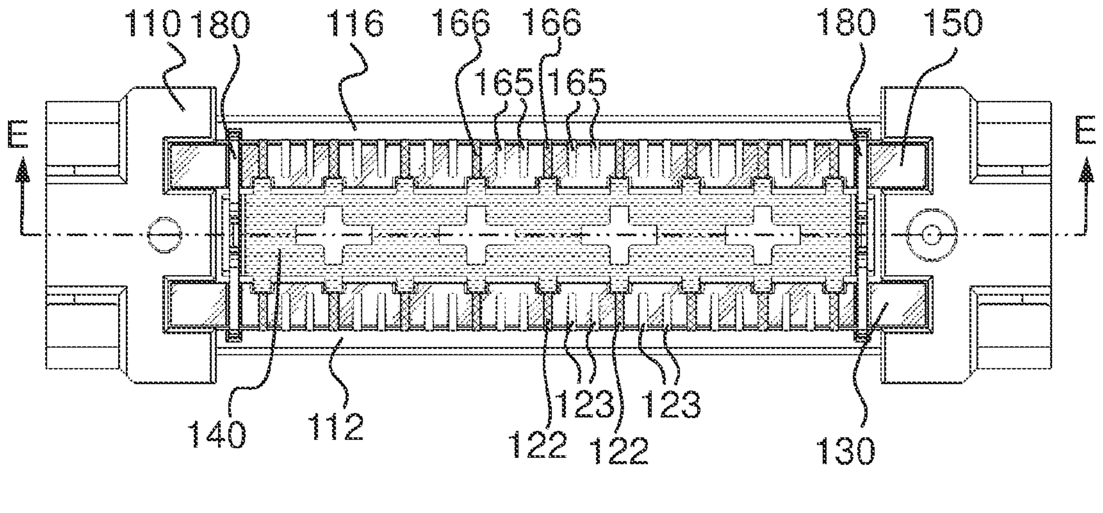
FIG. 4 is a top view of FIG. 1.
Figure 5:
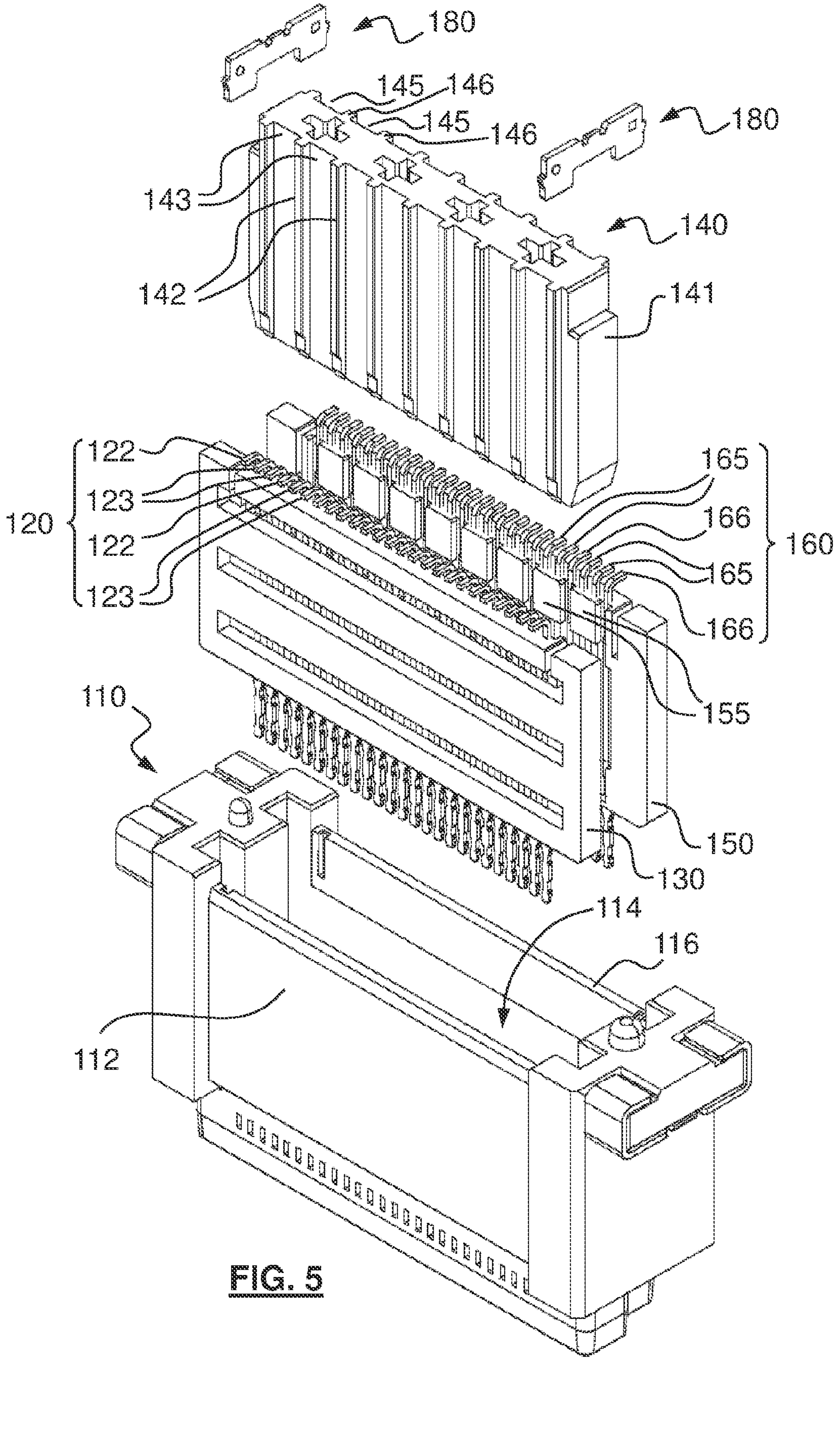
FIG. 5 is an exploded perspective view of the electrical connector shown in FIG. 1.

As shown in FIGS. 1, 3 and 4, first set of terminals 120 includes first signal pairs 123 and first ground terminals 122. Each of the first ground terminals 122 is disposed between adjacent first signal pairs 123. Second set of terminals 160 includes second signal pairs 165 and second ground terminals 166. Each of the second ground terminals 166 is disposed between adjacent second signal pairs 165. Housing 110 has windows 108 formed on first and second sidewalls 112, 116 (only windows 108 on first sidewall 112 are shown), corresponding to the positions of first and second signal pairs 123, 165. Spacer 140 is positioned closer to first and second ground terminals 122, 166 than to the first and second signal pairs 123, 165. Spacer 140 may be in contact with first and second ground terminals 122, 166 or alternatively, spacer 140 is spaced apart from the first and second ground terminals 122, 166 with an air gap. Windows 108 provide air space for first and second ground terminals 122, 166 which contributes to signal integrity performance of electrical connector 100.

Spacer 140 is electrically coupled to first and second ground terminals 122, 166 to serve as a resonant damping component to improve signal integrity of electrical connector 100.

Figure 6:
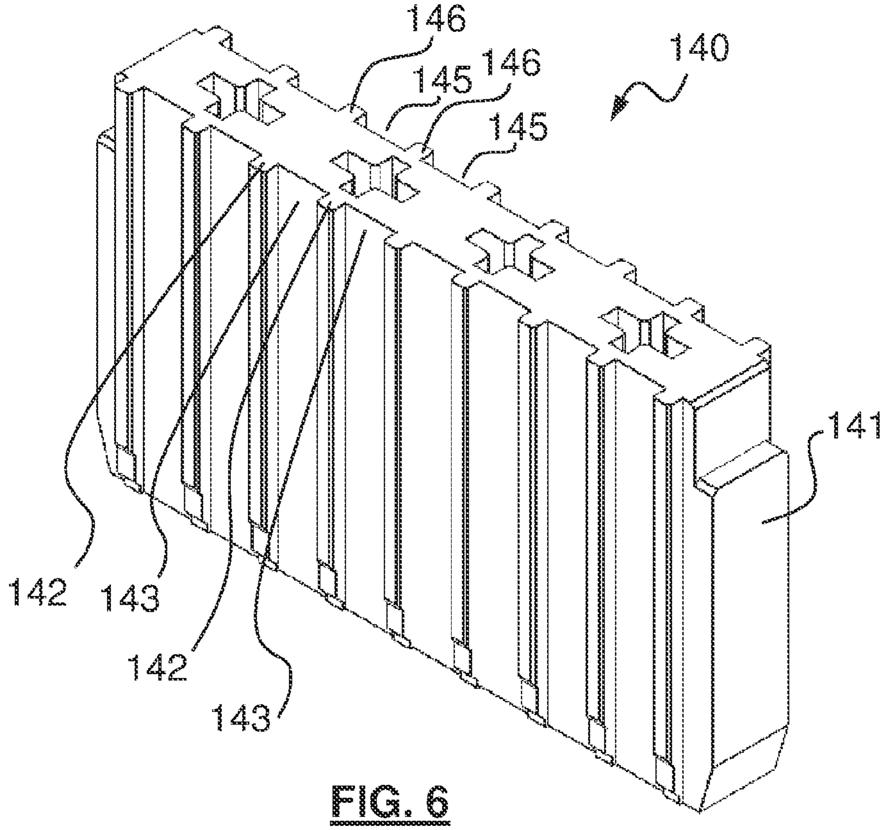
FIG. 6 is a perspective top view showing the spacer of the electrical connector of FIG. 1.
Figure 7:
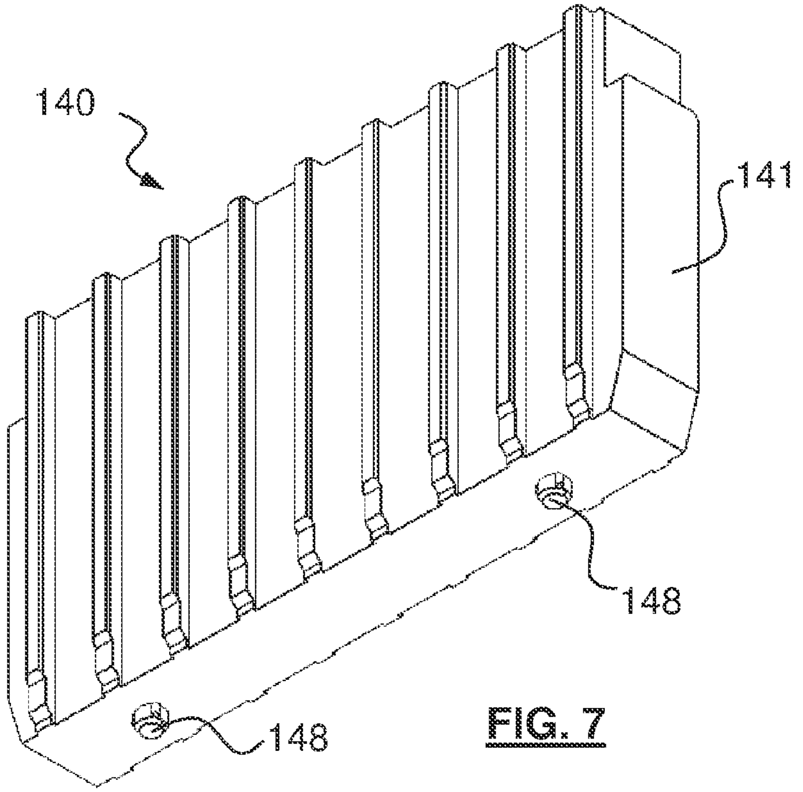
FIG. 7 is a perspective bottom view showing the spacer of FIG. 6.

First signal pairs 123 and first ground terminals 122 may be disposed in a first plane. Second signal pairs 165 and second ground terminals 166 may be disposed in a second plane. As shown in FIGS. 6 and 7, Spacer 140 has a base 141. At one side of base 141 there are formed first ridges 142 projecting from base 141 and facing first set of terminals 120. At an opposite side of base 141 there are formed second ridges 146 projecting from base 141 and facing second set of terminals 160. Between adjacent first ridges 142 there is formed a first notch 143. Between adjacent second ridges 146 there is formed a second notch 145. Each of the first ridges 142 is in alignment with one of the first ground terminals 122 with respect to width direction 104 of housing 110. Each of the second ridges 146 is in alignment with one of the second ground terminals 166 with respect to width direction 104 of housing 110. Each of the first ridges 142 is in contact with one of the first ground terminals 122, each of the second ridges 166 is in contact with the one of the second ground terminals 166. Alternatively, each of the first ridges 142 is spaced apart from one of the first ground terminals 122 with an air gap, and each one of the second ridges 146 is spaced apart from one of the second ground terminals 166 with an air gap.

In one embodiment, as shown with further details in FIGS. 6 to 20, electrical connector 100 includes a first frame 130 and a second frame 150. First frame 130 is molded to and supporting first set of terminals 120, to form a first Insert-Molded Leadframe Assembly (IMLA) 120*a*. Second frame 150 is molded to and supporting second set of terminals 160, to form a first Insert-Molded Leadframe Assembly (IMLA) 160*a*. First and second IMLAs 120*a*, 106*a* have symmetrical structures and dimensions, hence illustrations and references made in the context to one of the IMLAs applies to those made to the other one of the IMLAs, in conduction with FIGS. 8 and 9. First frame 130 is disposed between first sidewall 112 of housing 110 and spacer 140. Second frame 150 is disposed between second sidewall 116 of housing 110 and spacer 140.

Figure 8:
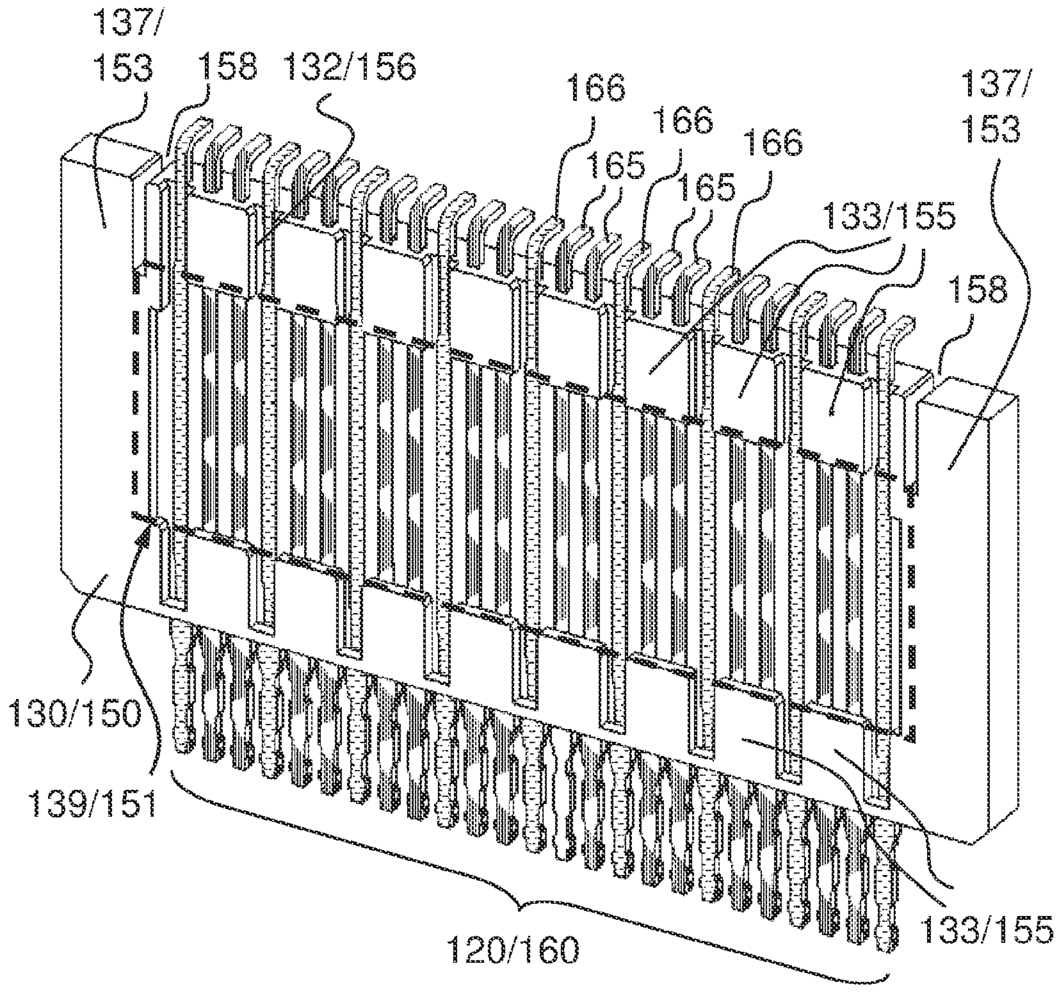
FIG. 8 is a perspective view showing the first set of terminals of the electrical connector of FIG. 1.
Figure 9:
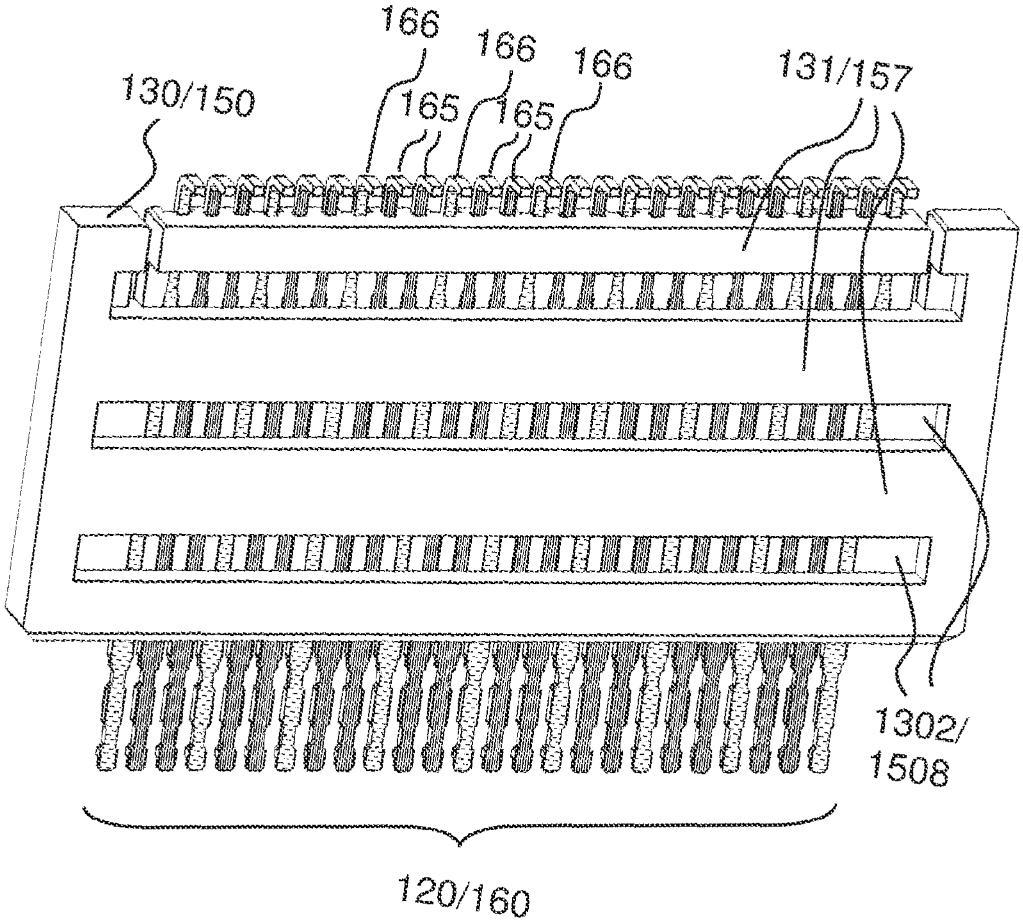
FIG. 9 is a perspective view the first set of terminals of FIG. 8 from another viewing angle.
Figure 10:
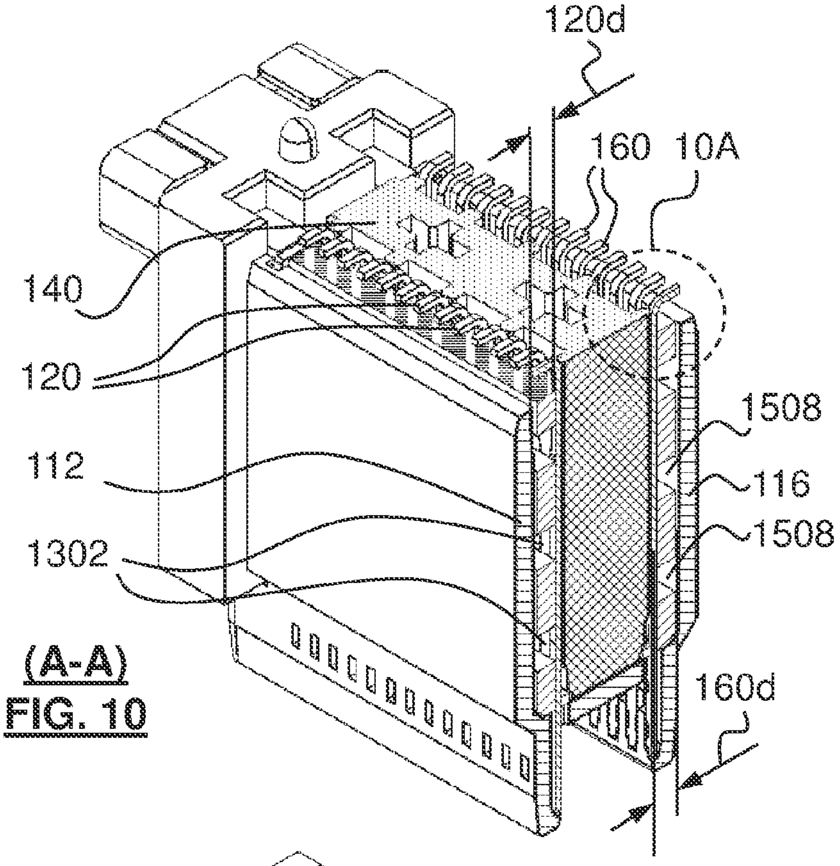
FIG. 10 is a cross sectional perspective view of the electrical connector shown in FIG. 3 along A-A, FIG. 11 cross sectional perspective view of the electrical connector shown in FIG. 3 along B-B.
Figure 11:
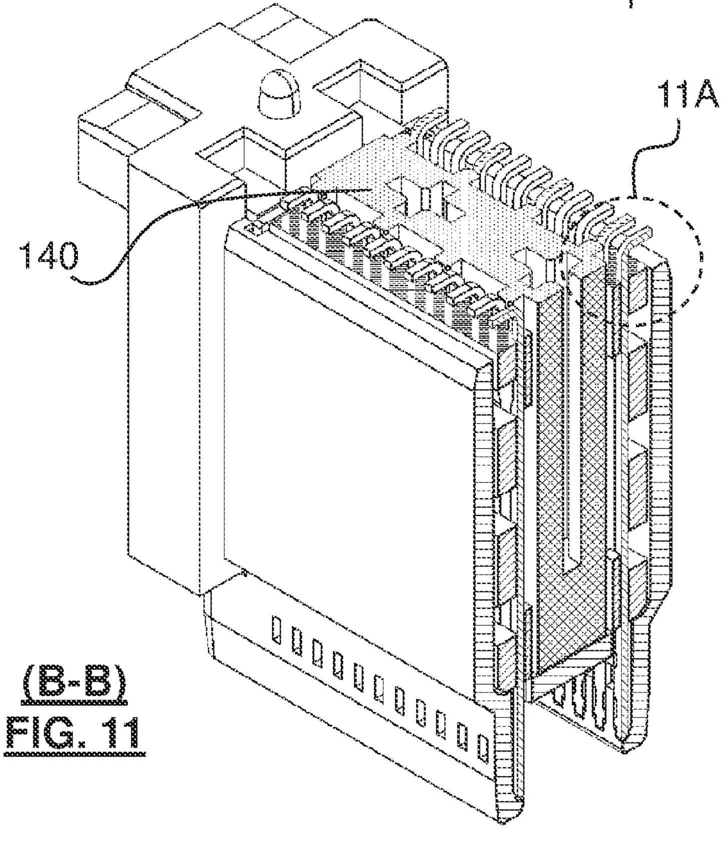
Figure 12:
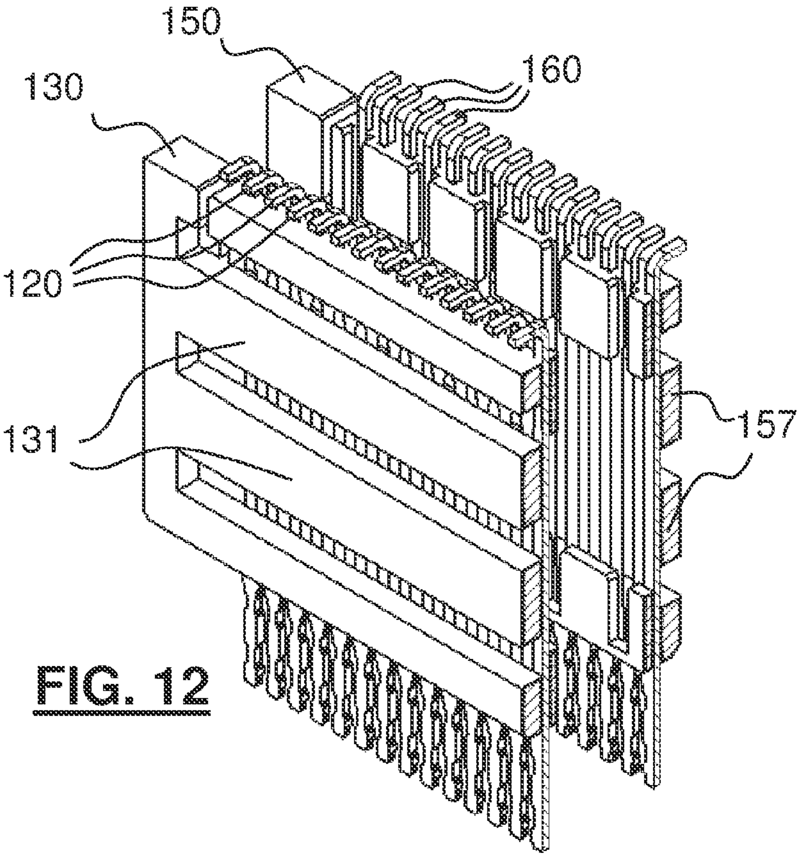
FIG. 12 is a perspective view of showing the first and second sets of terminals of the electrical connector shown in FIG. 10.
Figure 13:
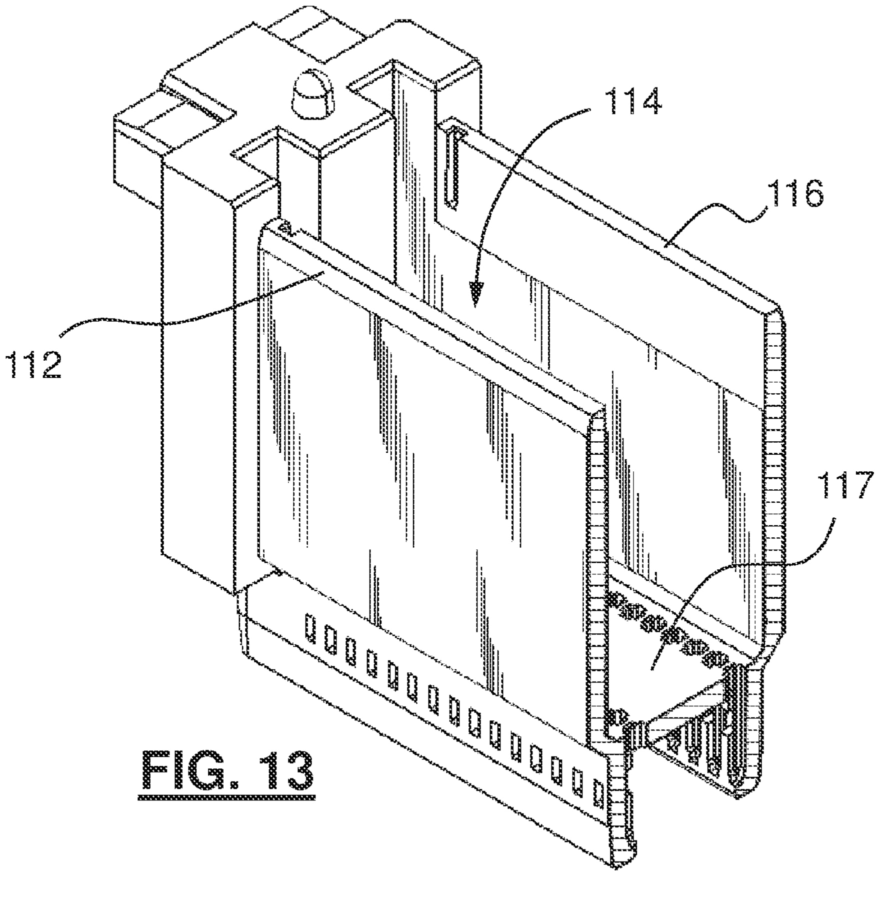
FIG. 13 is a perspective view of showing the housing of the electrical connector shown in FIG. 10.

As shown in FIGS. 8 and 9, first frame 130 has side columns 137 and first protuberances 133 facing spacer 140 and notches 132 between protuberances 133. Second frame 150 has second columns 153 and second protuberances 155 facing spacer 140, and notches 156 between protuberances 155. Each one of the first ridges 142 of spacer 140 is disposed in one of the first notches 132, each one of the second ridges 146 of spacer 140 is disposed in one of the second notches 156. Each one of the first and second protuberances 133, 155 is received between adjacent first and second ridges 143, 145 of spacer 140, respectively. First columns 137 and first protuberances 133 form a first recess 139 on first IMLA 120*a*, facing spacer 140. Likewise second columns 153 and second protuberances 155 form a second recess 151 on second IMLA 160*a*, facing spacer 140. The segment of first set of terminals 120 within first recess 139 are dented with respect to first columns 137 and first protuberances 133, and the segment of second set of terminals 160 within second recess 151 are dented with respect to second columns 153 and second protuberances 155. As such, there is formed an air gap between the first set of terminals 120 and spacer 140, and an air gap between the second set of terminals 160 and spacer 140. The air gaps serve to improve signal integrity performance between the signal contacts and spacer 140.

First frame 130 has first ribs 131 facing first sidewall 112 of housing 110. Second frame 150 has second ribs 157 facing second sidewall 116 of housing 110. First ribs 131 separate first set of terminals 120 from first sidewall 112 of housing 110. Second ribs 157 separate second set of terminals 160 from second sidewall 116 of housing 110.

Between first ribs 131 there are formed first openings 1302 through which first set of terminals 120 are partially exposed. Between second ribs 157 there are formed second openings 1508 through which second set of terminals 160 are partially exposed.

As shown in FIGS. 10 to 15, first set of terminals 120 is positioned with a distance 120*d* from first sidewall 112 of housing 110. Second set of terminals 160 is positioned with a distance 160*d* from second sidewall 116 of housing 110. First and second openings 1302, 1508 are formed for insert molding process of producing IMPAs 120*a*, 160*a*.

Figure 14:
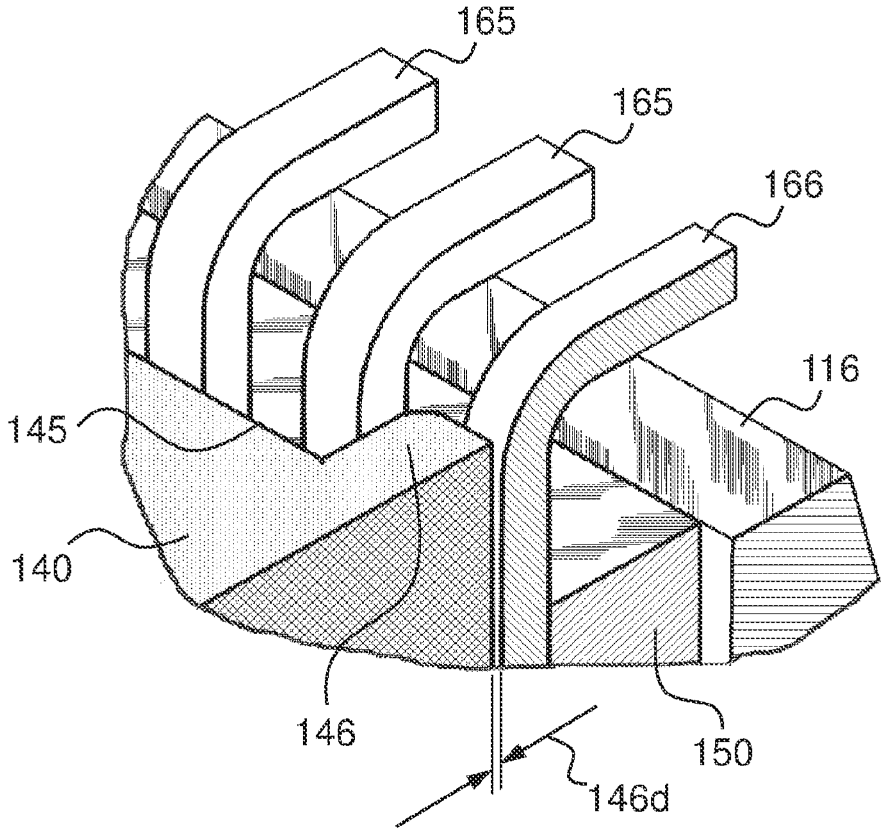
FIG. 14 is an enlarged view of portion 10A of FIG. 10.
Figure 15:
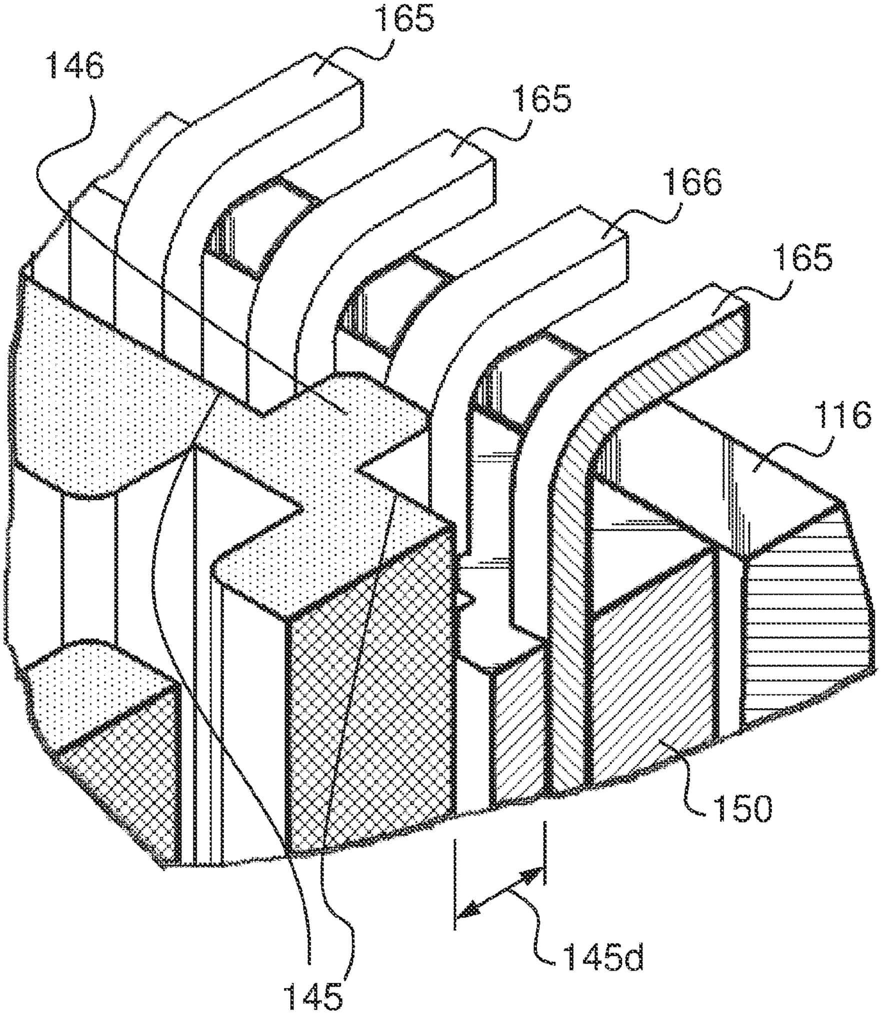
FIG. 15 is an enlarged view of portion 11A of FIG. 11.

FIGS. 14 and 15 shows the positional relationship between spacer 140 and second ground terminals 166, and that between spacer 140 and second signal pairs 165. The positional relationship between spacer 140 and first ground terminals and first signal pairs is the same. As shown in FIGS. 14 and 15, a distance between second ridge 146 of spacer 140 and a second ground terminal 166 is denoted as distance 146*d*. A distance between second notch 145 and a second signal pair 165 is denoted as distance 145*d*, in which, distance 145*d* is greater than distance 146*d*. Another words, spacer 140 is positioned closer to first and second ground terminals 122, 166 of first and second set of terminals 120, 160 to effect electrical coupling between spacer 140 and first and second ground terminals 122, 166 and achieve signal integrity improvement.

Figure 16:
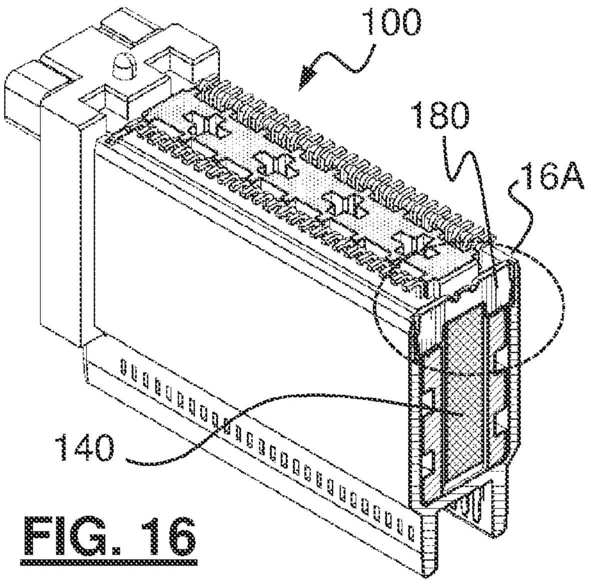
FIG. 16 is a cross sectional perspective view of the electrical connector shown in FIG. 3 along C-C.
Figure 17A:
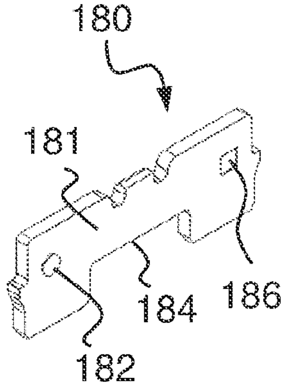
FIG. 17A is a perspective view showing a fixing tab of electrical connector of FIG. 16.
Figure 17B:
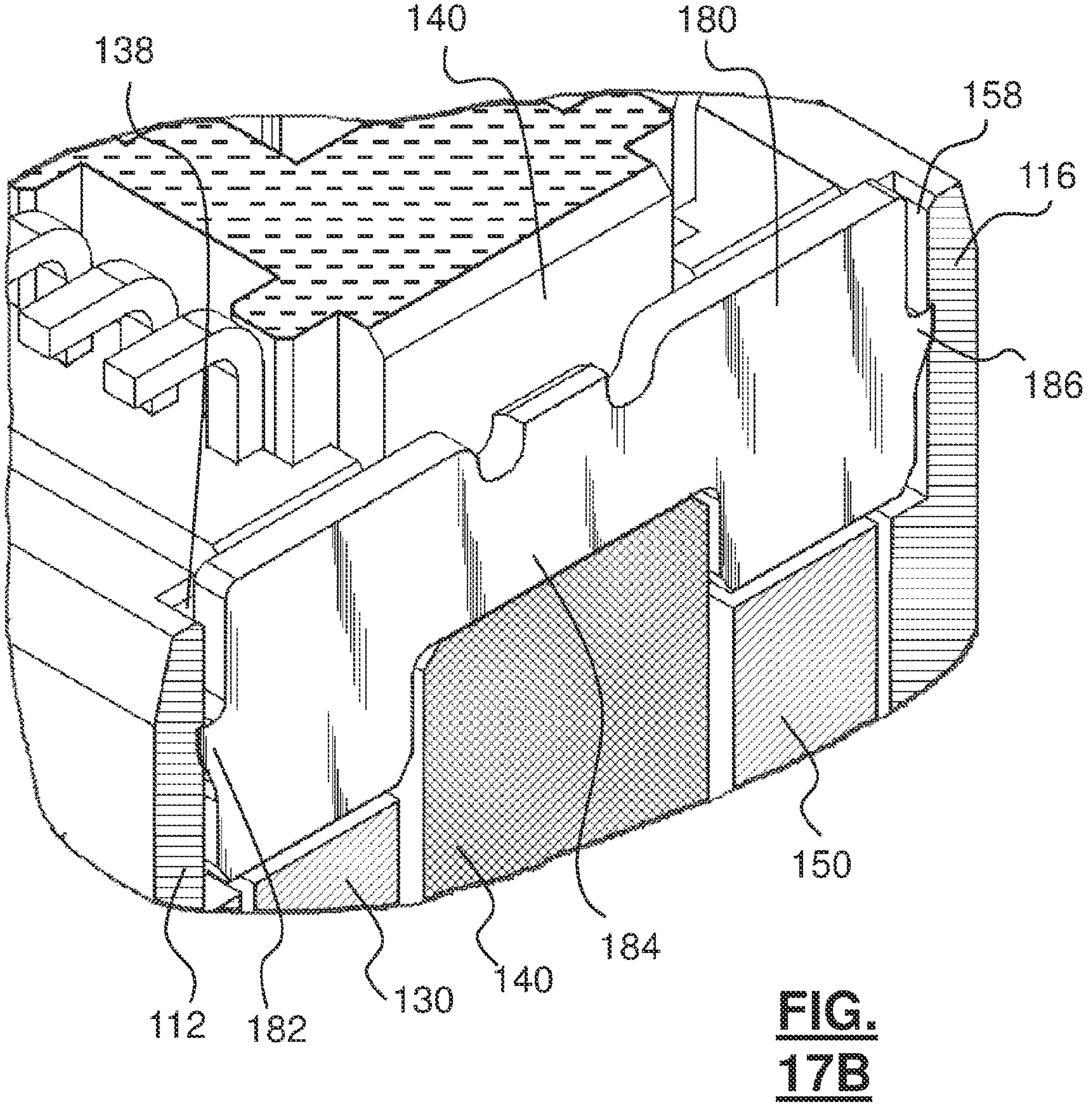
FIG. 17B is an enlarged view of portion 16A of FIG. 16.

As shown in FIGS. 16 and 17A and 17B, electrical connector 100 includes a pair of fixing tabs 180 secured to housing 110 and engaged to spacer 140. Each of the first and second frames 130, 150 has a pair of grooves 138, 158 into which each one of the fixing tabs 180 is fitted. Each fixing tab 180 has barbs 186 biting into sidewalls 112, 116 of housing 110 such that fixing tabs 180 are securely fixed to housing 110. Each fixing tab 180 has a main body 181 and first and second bosses 182, 186 raised from main body 181. Main body 181 is received into grooves 138, 158 with first and second bosses 182, 186 forced into respective first and second frames 130, 150 in the first and second grooves 138, 158. Each fixing tab 180 has a middle portion 184 engaged to spacer 140 to fix spacer 140 to housing 110.

Figure 18:
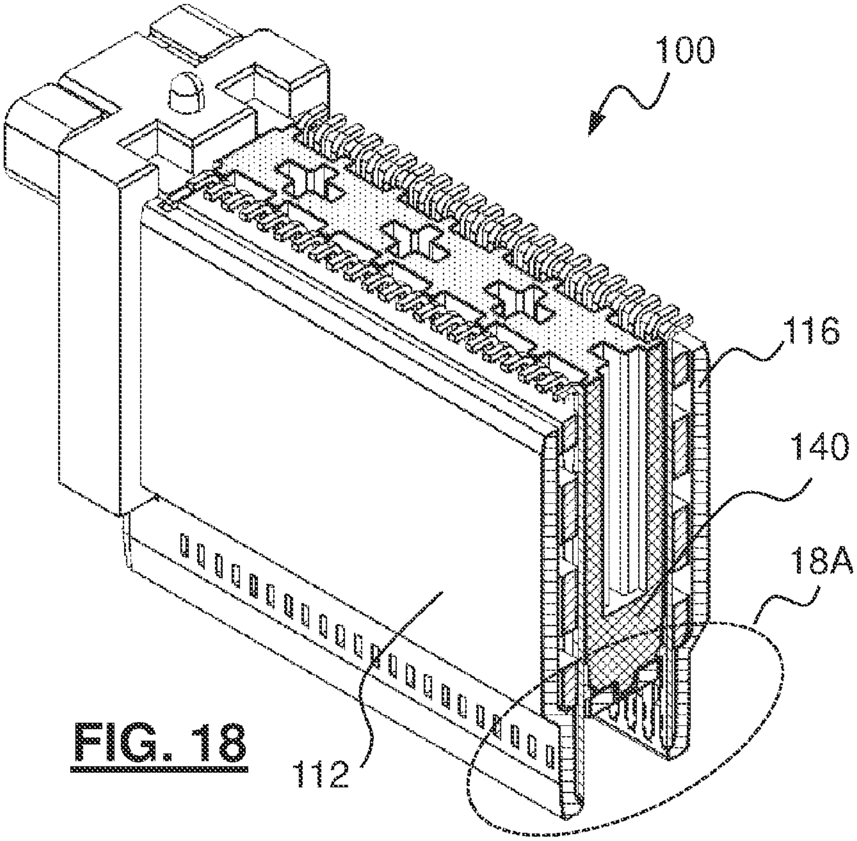
FIG. 18 is a cross sectional perspective view of the electrical connector shown in FIG. 3 along D-D.
Figure 19:
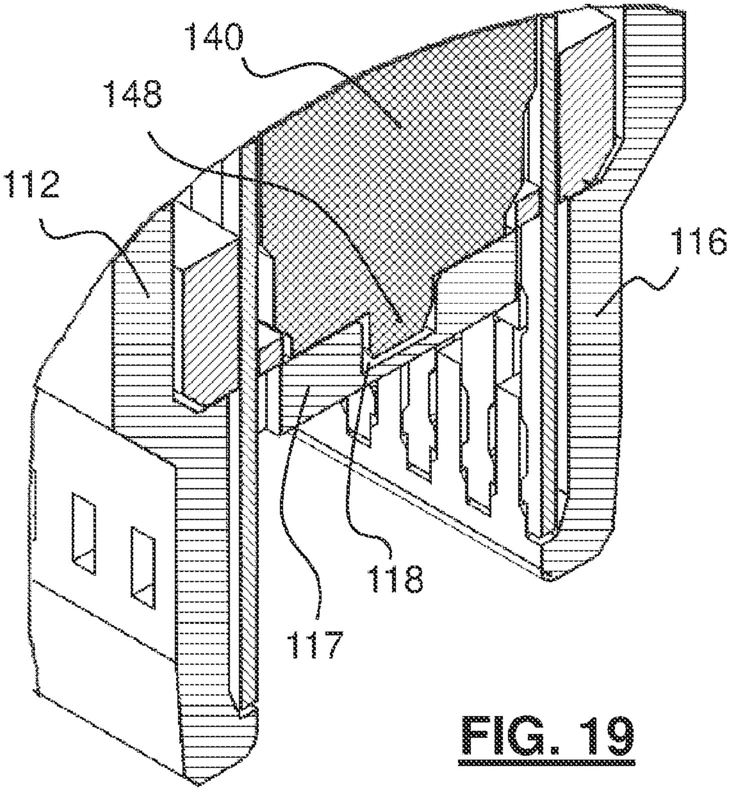
FIG. 19 is an enlarged view of portion 18A of FIG. 18.
Figure 20:
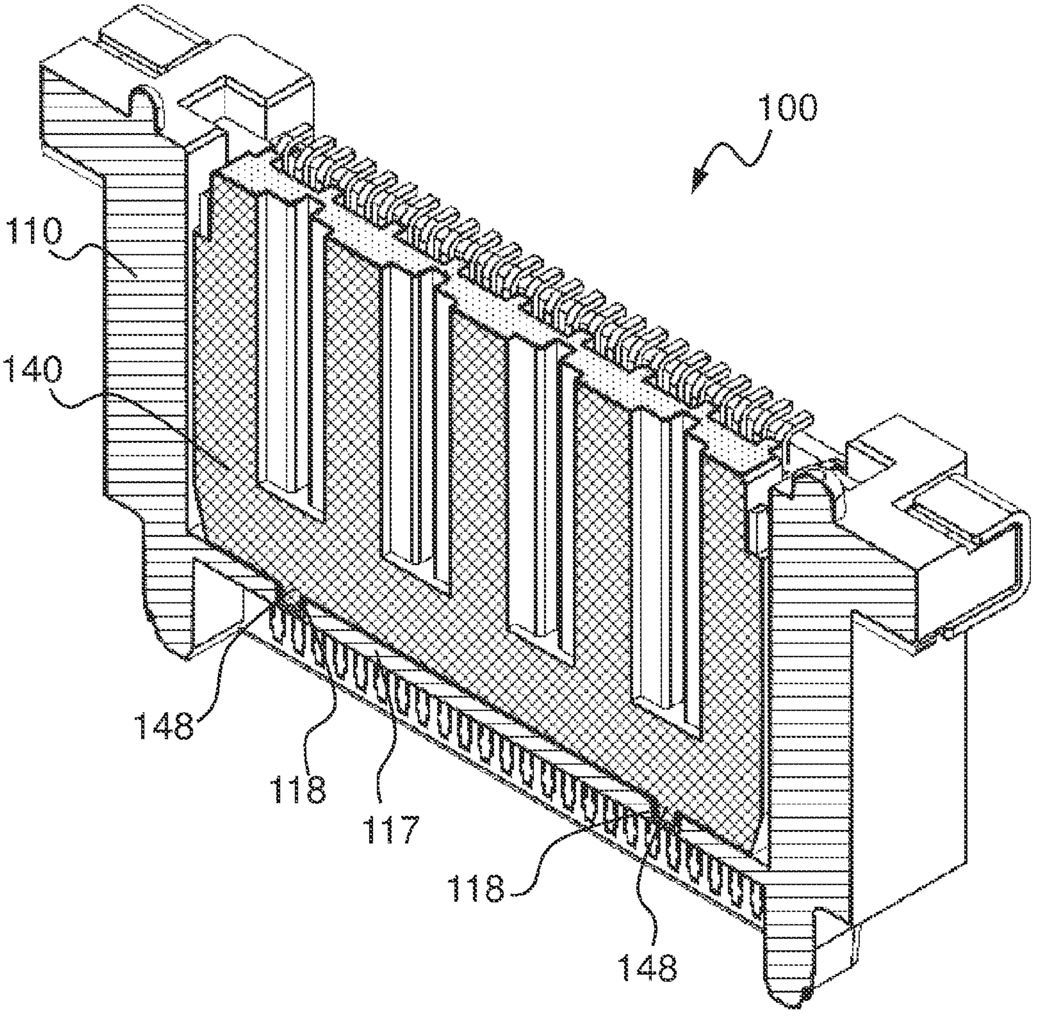
FIG. 20 is a cross sectional perspective view of the electrical connector shown in FIG. 4 along E-E.
Figure 21:
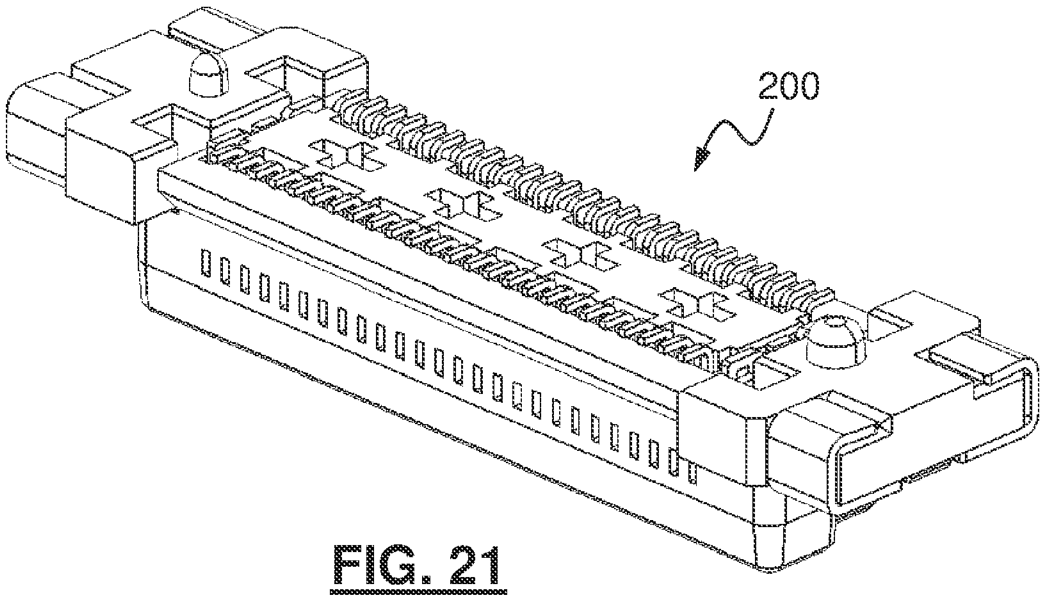
FIG. 21 is a perspective view of an electrical connector in accordance with another embodiment of the present invention.
Figure 22:
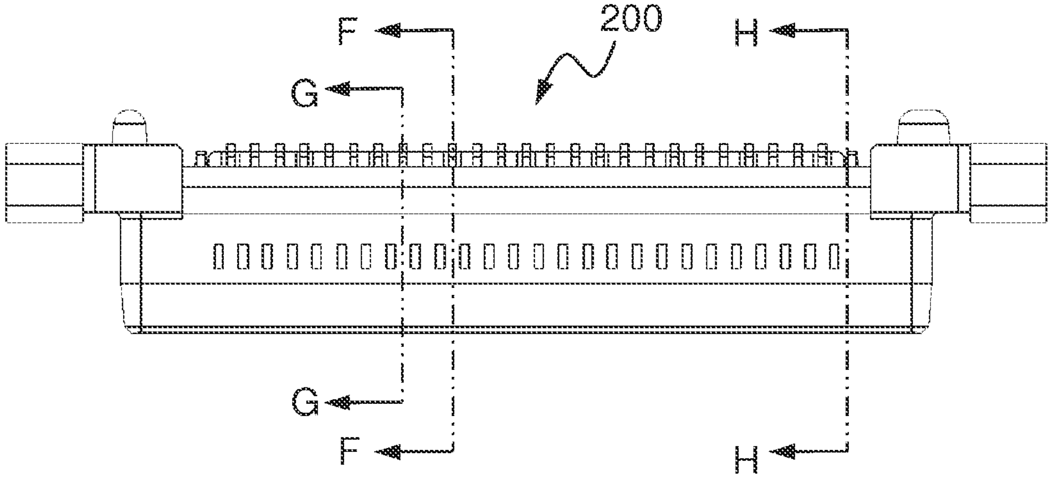
FIG. 22 is a front view of FIG. 21.
Figure 23:
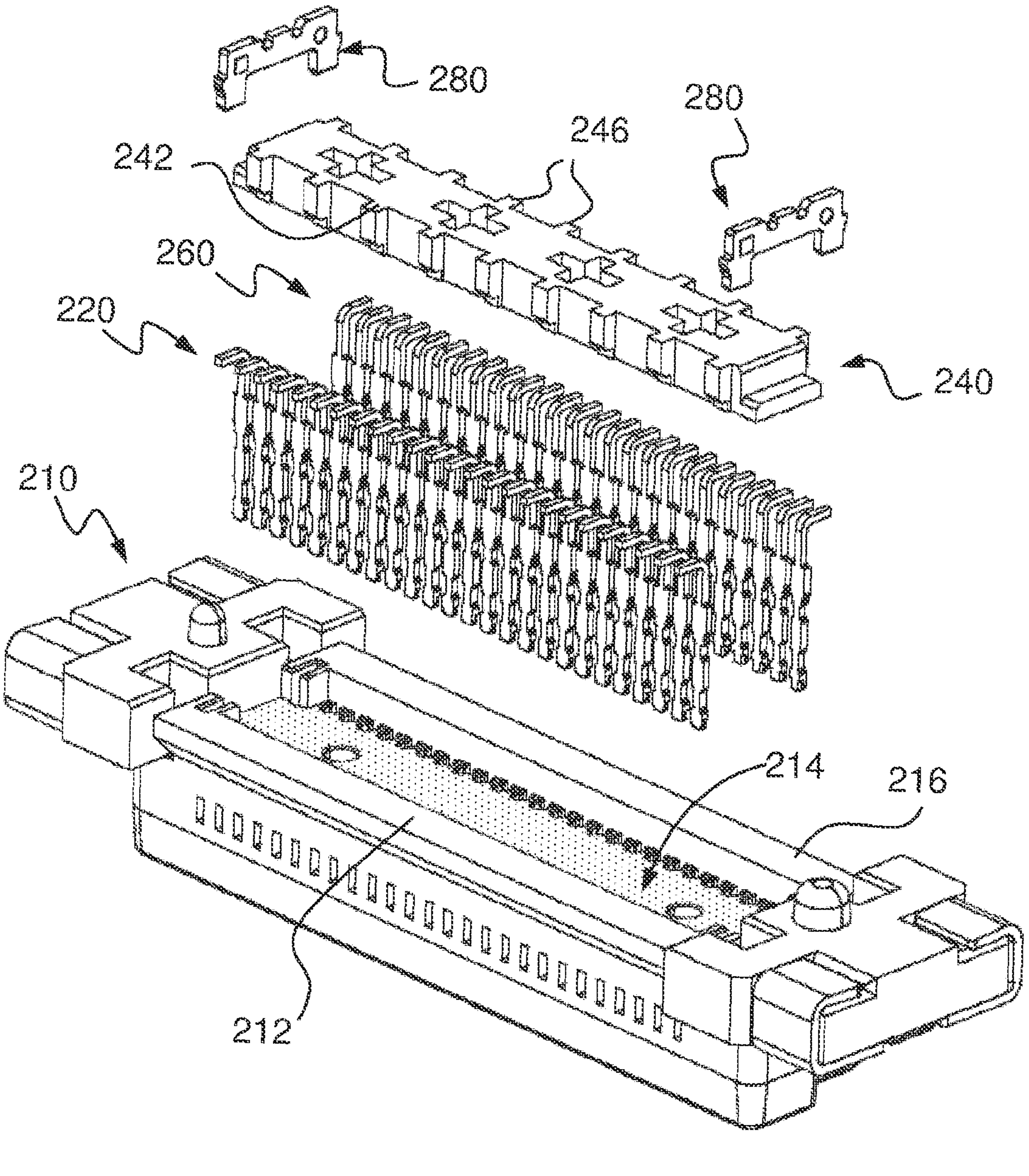
FIG. 23 is an exploded perspective view of the electrical connector shown in FIG. 21.
Figure 24:
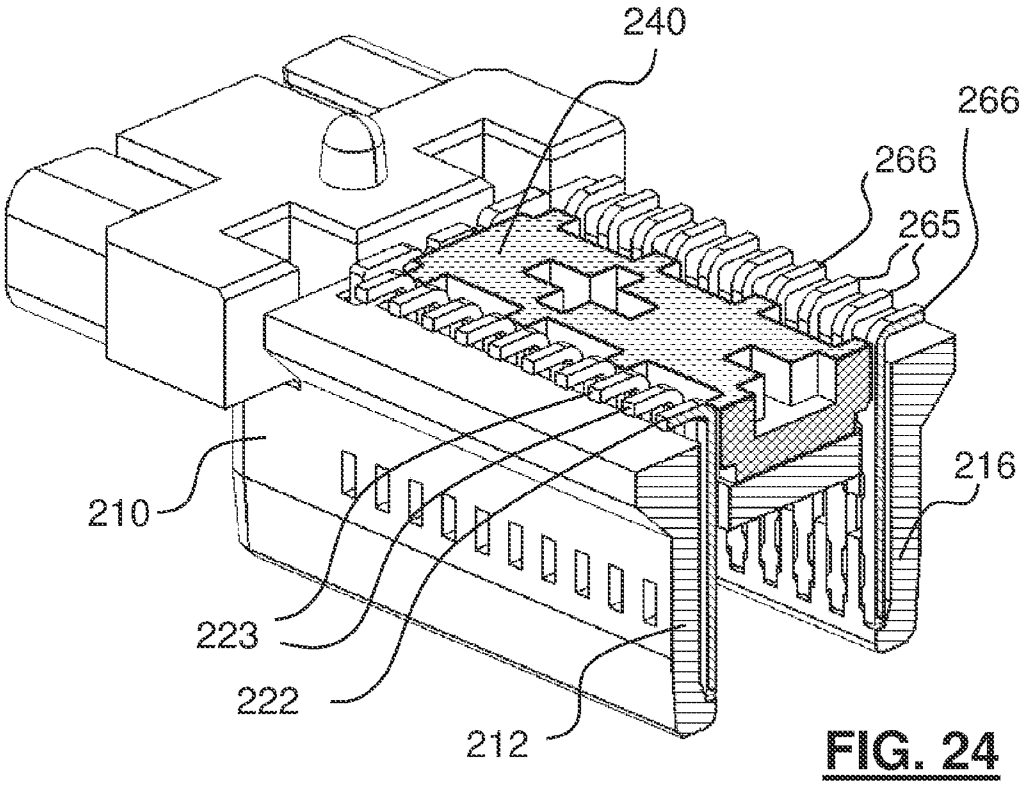
FIG. 24 is a cross sectional perspective view of the electrical connector shown in FIG. 22 along F-F.
Figure 25:
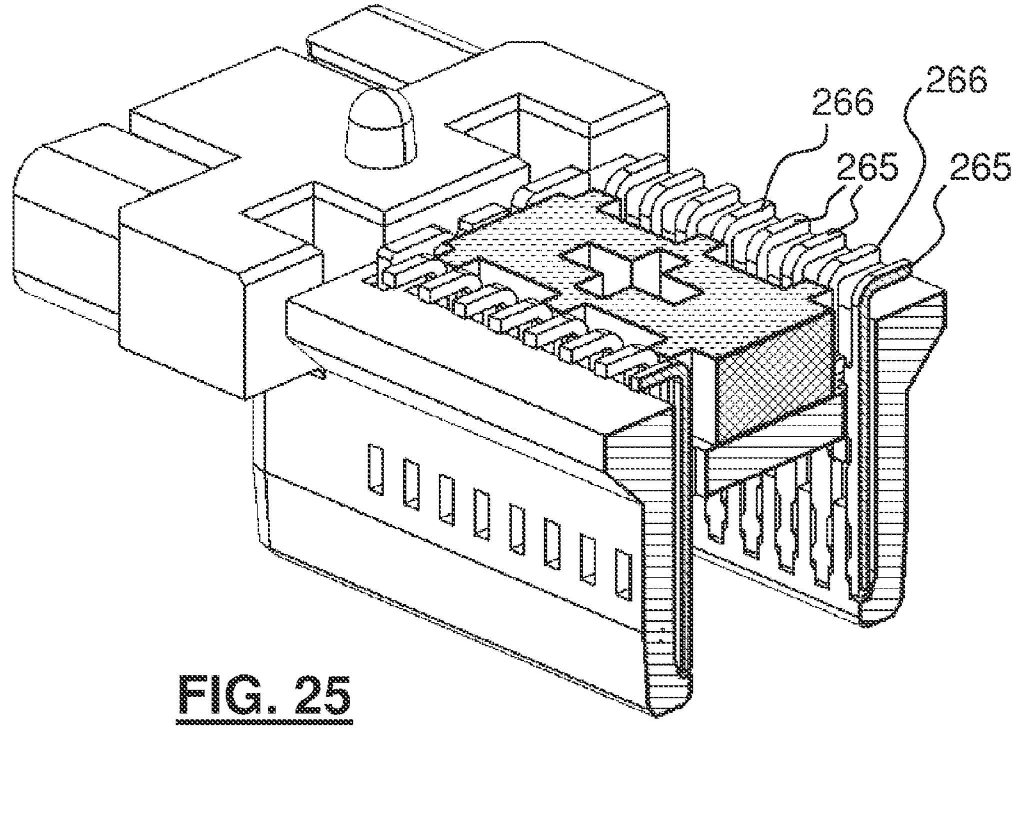
FIG. 25 is a cross sectional perspective view of the electrical connector shown in FIG. 22 along G-G.
Figure 26:
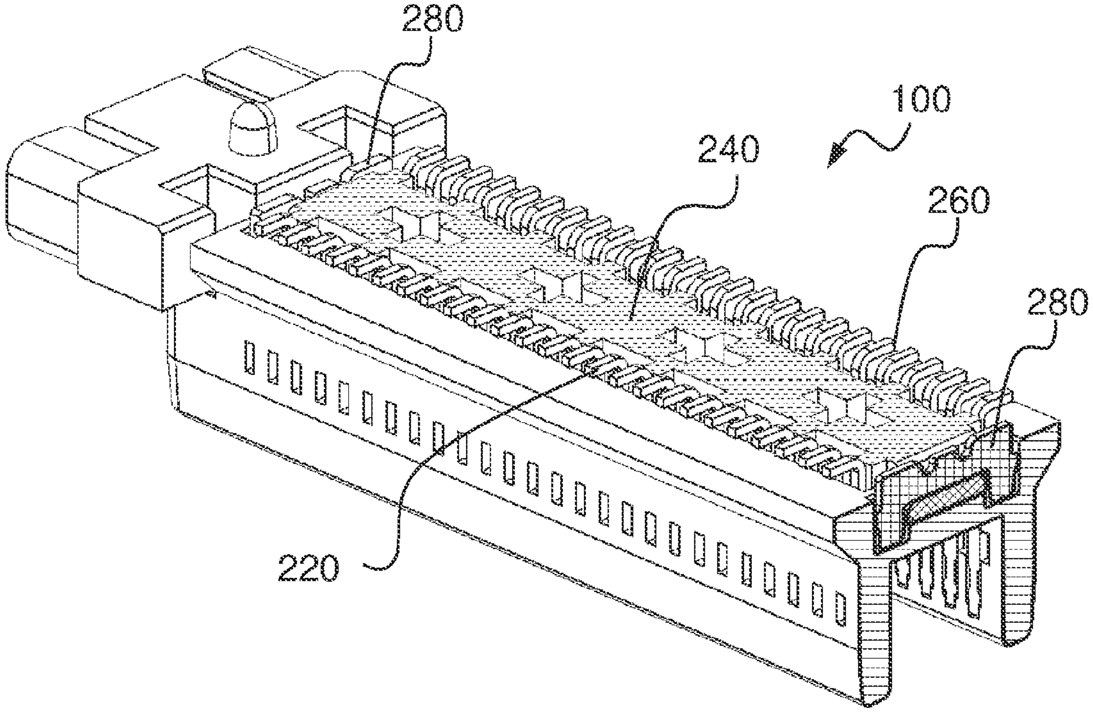
FIG. 26 is a cross sectional perspective view of the electrical connector shown in FIG. 22 along H-H.

As shown in FIGS. 18 to 20, connected to first and second sidewalls 112, 116 of housing 110 there is a partition 117 onto which spacer 140 is seated. Partition 117 has one or more recesses 118 formed thereon and accessible through cavity 114. Spacer 140 may include one or more pins 148 projecting downward from bottom surface thereof. Each pin 148 is received into a recess 118 such that movement of spacer 140 relative to housing 110 along depth direction 102 and width direction 104 is prevented.

In another embodiment, as shown in FIGS. 21 to 26, an electrical connector 200 includes a housing 210, first and second sets of terminals 220, 260, and a spacer 240. Housing 210 has a first sidewall 212 and a second sidewall 216 spaced apart from first sidewall 212, and a cavity 214 between first and second sidewalls 212, 216. First set of terminals 220 is disposed in cavity 214 adjacent to first sidewall 212, and second set of terminals 260 is disposed in cavity 214 adjacent to second sidewall 216. Spacer 240 is disposed in cavity 214 between first and second set of terminals 220, 260.

Electrical connector 200 is of a low-profile structure having a relatively smaller height dimension compared to that of the previous embodiment. First and second set of terminals 220, 260 are respectively attached to first and second sidewalls 212, 216 without additional support of a frame. First and second signal pairs 223, 265 are positioned in a relatively greater distance from spacer 240 and spacer 240 is electrically coupled to first and second ground terminals 222, 266 by being positioned closer to such ground terminals, via ridges 242, 246 projecting from spacer 240.

Similar to the previous embodiment, electrical connector 200 includes a pair of fixing tabs 280 fixed to housing 210 to secure spacer 240 to housing to ensure the correct positional relationship with first and second set of terminals 220, 260.

Although embodiments of the present invention have been illustrated in conjunction with the accompanying drawings and described in the foregoing detailed description, it should be appreciated that the present invention is not limited to the embodiments disclosed. Therefore, the present invention should be understood to be capable of numerous rearrangements, modifications, alternatives and substitutions without departing from the spirit of the invention as set forth and recited by the following claims.

The invention claimed is:

1. An electrical connector, comprising:

a housing having a first sidewall and a second sidewall spaced apart from the first sidewall in a first direction;

a first set of terminals disposed adjacent to the first sidewall and comprising first signal pairs and first ground terminals, each first ground terminal disposed between adjacent pairs of the first signal pairs, and each of the first set of terminals comprises a mating end, a contact tail, and an intermediate portion coupling the mating end to the contact tail;

a second set of terminals disposed adjacent to the second side wall and comprising second signal pairs and second ground terminals, each second ground terminal disposed between adjacent pairs of the second signal pairs, and each of the second set of terminals comprises a mating end, a contact tail, and an intermediate portion coupling the mating end to the contact tail; and a component electrically coupled to the first ground terminals to dampen resonance in the electrical connector, wherein the component comprises first portions protruding toward respective ones of the first ground terminals and first notches disposed between adjacent ones of the first portions.

2. The electrical connector of claim 1, wherein:

the intermediate portion of each of the first set of terminals is elongated from the mating end to the contact tail in a second direction parallel to the first sidewall;

the intermediate portion of each of the second set of terminals is elongated from the mating end to the contact tail in the second direction; and the contact tails of each of the first and second sets of terminals are configured for mounting to a surface that is normal to the second direction.

3. The electrical connector of claim 1, wherein the component is at least partially disposed between the first set of terminals and the second set of terminals.

4. The electrical connector of claim 1, wherein the housing comprises a first frame molded around the first set of terminals and disposed adjacent to the first sidewall and a second frame molded around the second set of terminals and disposed adjacent to the second sidewall.

5. The electrical connector of claim 1, wherein:

the housing comprises a first frame that supports the first set of terminals and comprises second notches; and the first portions of the component are received in respective ones of the second notches.

6. The electrical connector of claim 1, wherein the component is further electrically coupled to the second ground terminals to dampen resonance in the electrical connector.

7. The electrical connector of claim 6, wherein the component comprises:

first portions protruding toward respective ones of the first ground terminals and first notches disposed between adjacent ones of the first portions; and second portions protruding toward respective ones of the second ground terminals and second notches disposed between adjacent ones of the second portions.

8. A surface-mount electrical connector comprising:

a housing having a first sidewall and a second sidewall spaced apart from the first sidewall in a first direction, and a cavity between the first and second sidewalls;

a first set of terminals disposed in a first plurality of slots in the housing adjacent to the first sidewall and comprising first signal pairs and first ground terminals;

a second set of terminals disposed in a second plurality of slots in the housing adjacent to the second side wall and comprising second signal pairs and second ground terminals; and a component disposed in the housing and electrically coupled to the first ground terminals to dampen resonance in the surface-mount electrical connector, wherein:

the cavity extends through the housing from a first end, adjacent a first surface of the housing, to a second end, adjacent a second surface of the housing that is opposite the first surface; and contact tails of the first and second sets of terminals are exposed at the first surface and configured for mounting to a surface of a substrate that is parallel to the first surface.

9. The surface-mount electrical connector of claim 8, wherein each of the first set of terminals comprises a mating end exposed at the second surface, one of the contact tails exposed at the first surface, and an intermediate portion elongated from the mating end to the one of the contact tails.

10. The surface-mount electrical connector of claim 8, wherein the component is at least partially disposed between the first set of terminals and the second set of terminals.

11. The surface-mount electrical connector of claim 8, wherein the housing comprises a first frame molded around the first set of terminals and disposed adjacent to the first sidewall and a second frame molded around the second set of terminals and disposed adjacent to the second sidewall.

12. The surface-mount electrical connector of claim 8, wherein the component comprises first portions protruding toward respective ones of the first ground terminals and first notches disposed between adjacent ones of the first portions.

13. The surface-mount electrical connector of claim 12, wherein:

the housing comprises a first frame that supports the first set of terminals and comprises second notches; and the first portions of the component are received in respective ones of the second notches.

14. The surface-mount electrical connector of claim 8, wherein the component is further electrically coupled to the second ground terminals to dampen resonance in the surface-mount electrical connector.

15. The surface-mount electrical connector of claim 14, wherein the component comprises:

first portions protruding toward respective ones of the first ground terminals and first notches disposed between adjacent ones of the first portions; and second portions protruding toward respective ones of the second ground terminals and second notches disposed between adjacent ones of the second portions.

16. A board connector assembly comprising:

a printed circuit board having a surface; and a surface-mount board connector, comprising:

a housing having a first sidewall and a second sidewall spaced apart from the first sidewall in a first direction, and a cavity between the first and second sidewalls;

a first set of terminals disposed in a first plurality of slots in the housing adjacent to the first sidewall and comprising first signal pairs and first ground terminals, each of the first set of terminals comprising a mating end and a contact tail;

a second set of terminals disposed in a second plurality of slots in the housing adjacent to the second side wall and comprising second signal pairs and second ground terminals, each of the second set of terminals comprising a mating end and a contact tail; and a component disposed in the housing and electrically coupled to the first ground terminals to dampen resonance in the surface-mount board connector, wherein:

the cavity extends through the housing in a first direction normal to the surface of the printed circuit board from a first end of the housing to a second end of the housing;

at the first end, the contact tails of the first and second sets of terminals are mounted to the surface of the printed circuit board; and at the second end, the mating ends of the first and second sets of terminals are exposed.

17. The board connector assembly of claim 16, wherein the component is at least partially disposed between the first set of terminals and the second set of terminals.

18. The board connector assembly of claim 16, wherein:

the component comprises first portions protruding toward respective ones of the first ground terminals and first notches disposed between adjacent ones of the first portions;

the housing comprises a first frame that supports the first set of terminals and comprises second notches; and the first portions of the component are received in respective ones of the second notches.

19. The board connector assembly of claim 16, wherein the component is further electrically coupled to the second ground terminals to dampen resonance in the electrical connector.

* * * * *